(12) United States Patent
Huang et al.

(10) Patent No.: US 11,309,543 B2
(45) Date of Patent: Apr. 19, 2022

(54) ELECTRODE ACTIVE COMPOSITION WITH REDUCED AMOUNT OF COBALT

(71) Applicants: Guiqing Huang, Newton, MA (US); Boshan Mo, Newton, MA (US); Youde Mo, Newton, MA (US)

(72) Inventors: Guiqing Huang, Newton, MA (US); Boshan Mo, Newton, MA (US); Youde Mo, Newton, MA (US)

(73) Assignees: Guangxi Nowphene Energy Storage Technologies Co., Ltd, Nanning (CN); Boston Global Technologies, LLC, Woburn, MA (US)

( * ) Notice: Subject to any disclaimer, the term of this patent is extended or adjusted under 35 U.S.C. 154(b) by 374 days.

(21) Appl. No.: 16/516,249

(22) Filed: Jul. 18, 2019

(65) Prior Publication Data

US 2021/0020931 A1 Jan. 21, 2021

(51) Int. Cl.
*H01M 4/505* (2010.01)
*H01M 4/525* (2010.01)
*C01G 53/00* (2006.01)

(52) U.S. Cl.
CPC ............ *H01M 4/505* (2013.01); *C01G 53/50* (2013.01); *H01M 4/525* (2013.01)

(58) Field of Classification Search
CPC ........ H01M 4/505; H01M 4/525; C01G 53/50
See application file for complete search history.

(56) References Cited

U.S. PATENT DOCUMENTS

2009/0212267 A1* 8/2009 Dobbs ................. H01M 4/5825
252/521.2

* cited by examiner

*Primary Examiner* — James Lee
(74) *Attorney, Agent, or Firm* — George Guosheng Wang; United States Research and Patent Firm

(57) ABSTRACT

The present invention provides an electrode active composition represented by formula (I). $Li_{1+x}Mn_aNi_bO_{2+x} \cdot Li_yCo_yO_{2y} \cdot D*C$ (I), wherein x>0, 0<y<0.1, a+b=1, 1.2≤a/b≤3.0; and D and C are optional dopants and coating agents that contain no cobalt element. The active compositions of Formula (I) exhibit electrochemical properties comparable to those with a higher cobalt amount, such as NCM523 electrode material ($LiNi_{0.5}Co_{0.2}Mn_{0.3}O_2$).

19 Claims, 13 Drawing Sheets

ELECTRODE ACTIVE COMPOSITION WITH REDUCED AMOUNT OF COBALT

CROSS-REFERENCE TO RELATED APPLICATIONS

Not applicable.

FIELD OF THE INVENTION

The present invention generally relates to an electrode active composition with reduced amount of cobalt.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise ternary system (NMC/NCA), $LiCoO_2$, LiMnO4, and LiFePO4 etc. Among them, LiCoO2 exhibits some advantages such as high rolling density.

However, there are some problems associated with the use of Co element. First, Cobalt has a risk of ignition due to its reaction with an electrolyte. Second, when too much cobalt is taken into human, harmful health effects can occur. Workers who breathed air containing 0.038 mg cobalt/$m^3$ for 6 hours had trouble breathing. Serious effects on the lungs, including asthma, pneumonia, and wheezing, have been found in people exposed to 0.005 mg cobalt/$m^3$ while working with hard metal, a cobalt tungsten carbide alloy. People exposed to 0.007 mg cobalt/$m^3$ at work have also developed allergies to cobalt that resulted in asthma and skin rashes. Third, cobalt is too expensive, and is not cost-effective.

Therefore, there exists a need to minimize or even eliminate the use of cobalt in the battery industry. Advantageously, the present invention provides a solution that can fulfill the need.

SUMMARY OF THE INVENTION

One aspect of the present invention provides an electrode active composition represented by formula (I):

$$Li_{1+x}Mn_aNi_bO_{2+x}\cdot Li_yCo_yO_{2y}\cdot D*C \qquad (I)$$

wherein x>0, 0<y<0.1, a+b=1, and 1.2≤a/b≤3.3;

wherein D is one or more dopants that contain(s) no Cobalt (Co) element, and D may be present or absent (i.e optional) in formula (I); and wherein C is one or more coating agents that contain(s) no Cobalt element, and C may be present or absent (i.e. optional) in formula (I).

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

Figure 1:
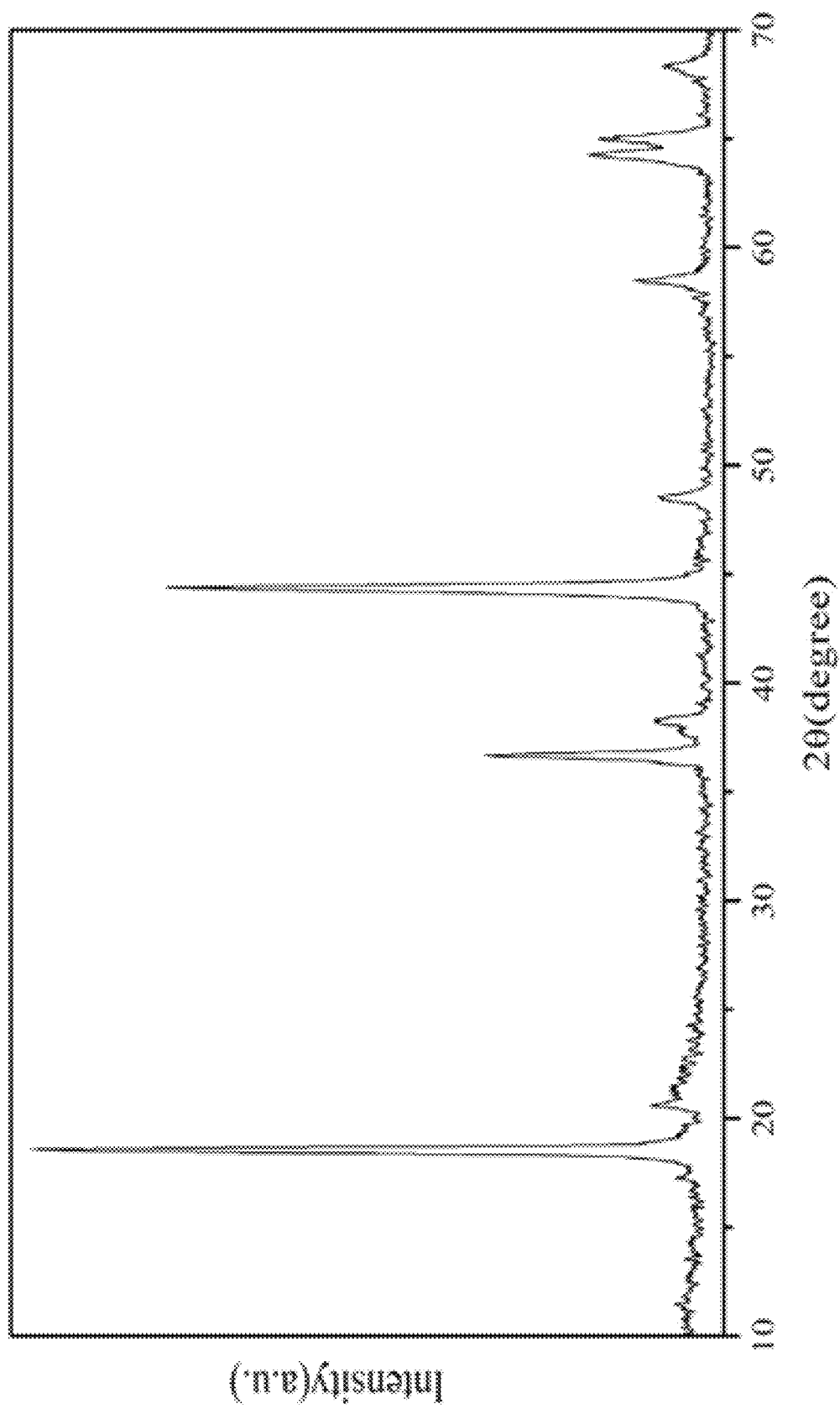
FIG. 1 is an X-ray diffraction (XRD) pattern of an active composition of Formula (I), wherein x=0.43, y=0.046, a=0.715, b=0.285, a/b=2.5, D is Li0.045Ti0.021O0.063, and C is absent, in accordance with an exemplary embodiment of the present invention.

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

In general embodiments of the invention, the electrode active compositions may be represented by formula (I):

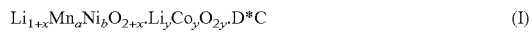

$$Li_{1+x}Mn_aNi_bO_{2+x} \cdot Li_yCo_yO_{2y} \cdot D*C \qquad (I)$$

wherein x>0, 0<y<0.1, a+b=1, and 1.2≤a/b≤3.3;

wherein D is one or more dopants that contain(s) no Cobalt (Co) element, and D may be present or absent (i.e optional) in formula (I); and wherein C is one or more coating agents that contain(s) no Cobalt element, and C may be present or absent (i.e. optional) in formula (I).

The term "element" or "Co element" in the definition of formula (I) is used in conventional way as referring to a member of the periodic table in which the element has the appropriate oxidation state if the element is in a composition, or in which the element is in its elemental form only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

It should be appreciated that the values of x, y, a, and b in Formula (I) are based on the molar quantities of starting materials in the synthesis, which can be accurately determined With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

That being said, for the y value in Formula (I) associated with Co amount, in various embodiments of the invention, $Y_L \leq y \leq Y_H$, wherein $Y_L$ and $Y_H$ are selected from 0.001, 0.002, 0.003, 0.004, 0.005, 0.006, 0.007, 0.008, 0.009, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.035, 0.04, 0.045, 0.05, 0.055, 0.06, 0.065, 0.07, 0.071, 0.072, 0.073, 0.074, 0.075, 0.076, 0.077, 0.078, 0.079, 0.08, 0.081, 0.082, 0.083, 0.084, 0.085, 0.086, 0.087, 0.088, 0.089, 0.09, 0.091, 0.092, 0.093, 0.094, 0.095, 0.096, 0.097, 0.098, and 0.099, providing that $Y_L \leq Y_H$. For example, y value may be 0.01≤y≤0.07.

In preferred embodiments of the invention, the y value in Formula (I) is in the range of $Y_L \leq y \leq Y_H$, wherein $Y_L$ and $Y_H$ are selected from 0.01, 0.02, 0.03, 0.035, 0.04, 0.045, 0.05, 0.055, 0.06, 0.065, and 0.07, providing that $Y_L \leq Y_H$. In more preferred embodiments, $Y_L$ and $Y_H$ are selected from 0.01, 0.02, 0.023, 0.03, 0.034, 0.045, 0.046, and 0.05. In most preferred embodiments, y is 0.01, 0.015, 0.02, 0.023, 0.03, 0.034, 0.045, 0.046, or 0.05.

In various embodiments of the invention, the x value in Formula (I) is in the range of $X_L \leq x \leq X_H$, wherein $X_L$ and $X_H$ are selected from 0.1, 0.15, 0.2, 0.28, 0.3, 0.35, 0.375, 0.4, 0.43, 0.45, 0.5, 0.55, and 0.6, providing that $X_L \leq X_H$. In preferred embodiments, $X_L$ and $X_H$ are selected from 0.28, 0.375, 0.4, and 0.43. In more preferred embodiments, x is 0.28, 0.375, 0.4, or 0.43.

The a/b ratio in Formula (I) is so controlled that a balance between Mn and Ni can provide for Mn to remain in a +4 valance as the composition is cycled in the battery. This balance avoids the formation of Mn+3, which has been associated with dissolution of Mn into the electrolyte and a corresponding loss of capacity. Also, coating of the composition with an inorganic coating material *C in Formula (I) further influences this chemistry, as evidenced by the change in the specific capacity as well as the irreversible capacity loss. Furthermore, for coated samples, the discharge capacity can increase relative to uncoated samples. In various embodiments of the invention, the a/b ratio in Formula (I) is in the range of $(a/b)_L \leq a/b \leq (a/b)_H$, wherein $(a/b)_L$ and $(a/b)_H$ are selected from 1.2, 1.3, 1.4, 1.5, 1.6, 1.7, 1.8, 1.9, 2.05, 2.1, 2.2, 2.3, 2.4, 2.5, 2.6, 2.7, 2.8, 2.9, 3.0, 3.1, 3.2, and 3.3, providing that $(a/b)_L \leq (a/b)_H$. In preferred embodiments, $(a/b)_L$ and $(a/b)_H$ are selected from 1.7, 2.05, 2.2, and 2.5. In more preferred embodiments, a/b is 1.7, 2.05, 2.2, or 2.5.

In various embodiments of the invention, D and C in Formula (I) are independently of each other selected from $M_{(0-0.1)}$ oxides, $M_{(0-0.1)}$ fluorides, salts of $M_{(0-0.1)}$ with the conjugate base of an inorganic acid, or any combination thereof, wherein M is selected from Li, Mg, Sr, Ba, Cd, Zn, Al, Ga, B, Zr, Ti, Ca, Ce, Y, Nb, Cr, Fe, Mo, W, and V. For example, D and C may be independently of each other selected, by stoichiometry, from the group consisting of Al2O3, MgO, Cr2O3, SnO2, SrO2, ZnO, Nb2O5, ZrO2, TiO2, FeO, Fe3O4, AlF3, BF3, FeF3, CaF2, MgF2, B2O3, B2O5, LiF, SrF2, SnF2, ZnF2, CuF2, MnF2, NiF2, LiB3O5, $Li_3BO_3$, $LiBO_2$, $Li_3B_7O_{12}$, $LiAlO_2$, $Li_2SiO_3$, $Li_8SiO_6$, $LiPO_3$, $Li_3PO_4$, $LiTi_2(PO_4)_3$, $Li_4Ti_5O_{12}$, $LiNbO_3$, $Li_3NbO_4$, $Li_2ZrO_3$, $Li_3TaO_3$, $LiCr_3O_8$, $LiVO_3$, $Li_2MoO_4$, $Li_2Mo_2O_7$, $Li_2TiO_3$, $Li_2WO_4$, $LiTa_3O_8$, $Li_4GeO_4$, $LiFePO_4$, and $Fe_2P_2O_7$.

In preferred embodiments, D in Formula (I) may be selected from the group consisting of $Li0.045Ti0.021O0.063$, $Sn0.01O0.02$, $Li0.03V0.03O0.09$, and $Li0.1Mo0.05O0.2$ C may be selected from the group consisting of $Al0.039F0.12$, $Al0.039O0.058$, $Al0.03F0.09$, $Al0.05F0.15$, $Ca0.03F0.06$, $Ca0.05F0.1$, $Li0.01V0.01O0.03$, $Li0.03(PO4)0.01$, $Li0.03Al0.03O0.06$, $Li0.03Mo0.03O0.12$, $Li0.03Nb0.03O0.09$, $Li0.03V0.03O0.09$, $Li0.06W0.03O0.12$, $Li0.05Al0.05O0.1$, $Li0.05Nb0.05O0.10$, $Li0.05V0.05O0.15$, $Li0.05W0.05O0.2$, $Li0.06(PO4)0.02$, $Li0.06W0.03O0.12$, $Li0.08W0.04O0.16$, $Li0.09B0.03O0.09$, $Li0.15(PO4)0.05$, $Li0.15B0.05O0.1$, $Li0.15B0.05O0.15$, $Li0.1Mo0.05O0.2$, $Mg0.03F0.06$, $Mg0.05F0.1$, $Zn0.05O0.05$, $Zn0.07O0.07$, $Zr0.03O0.06$, and $Zr0.05O0.1$.

In more preferred embodiments, the D*C moiety in Formula (I) may be selected from the group consisting of:
Li0.045Ti0.021O0.063*Al0.039O0.058,
Li0.045Ti0.021O0.063*Al0.039F0.12,
Sn0.01O0.02*Al0.039O0.058,
Sn0.01O0.02*Al0.039F0.12,
Sn0.01O0.02*Li0.01V0.01O0.03,
Li0.03V0.03O0.09*Zn0.07O0.07,
Li0.03V0.03O0.09*Li0.05Al0.05O0.1,
Li0.03V0.03O0.09*Al0.05F0.15,
Li0.03V0.03O0.09*Ca0.05F0.1,
Li0.1Mo0.05O0.2*Ca0.03F0.06,
Li0.1Mo0.05O0.2*Li0.03(PO4)0.01,
Li0.1Mo0.05O0.2*Li0.03V0.03O0.09,
Li0.1Mo0.05O0.2*Al0.03F0.09,
Li0.1Mo0.05O0.2*Zn0.05O0.05, and
Li0.1Mo0.05O0.2*Li0.03Al0.03O0.06.

In various embodiments, coating "*C" in Formula (I) such as metal fluoride coatings can provide significant improvements for the active compositions of the invention. These improvements relate to long term cycling with significantly reduced degradation of capacity, a significant decrease in first cycle irreversible capacity loss and an improvement in the capacity generally. The thickness of coating material can be selected to accentuate the observed performance improvements. Metal oxides and metal phosphates may also be used as coatings for positive electrode active materials.

Crystal structures of the active compositions of Formula (I) can be evaluated by powder x-ray diffraction (XRD), and powder XRD is an established method for evaluating the crystallinity of inorganic powders. Following convention in the art, plots of scattering intensity are presented as a function of the scattering angle $2\theta$. The complication of examining the complex lithium metal oxides is that the different crystalline phases have very similar lattice constants to each other so that the changes in the XRD spectrum are subtle.

The active compositions of Formula (I) may be prepared with carbonate, oxalate, and/or hydroxide co-precipitation processes. Generally, a solution is formed from which a metal hydroxide or carbonate is precipitated with the desired metal stoichiometry. The metal hydroxide or carbonate compositions from co-precipitation can be subsequently heat-treated to form the corresponding metal oxide composition with appropriate crystallinity. The lithium cations can either be incorporated into the initial co-precipitation process, or the lithium can be introduced in a solid state reaction during or following the heat treatment to form the oxide compositions from the hydroxide or carbonate compositions. As demonstrated in the examples below, the resulting active compositions of Formula (I) formed with the co-precipitation process have improved performance properties.

In the co-precipitation process for preparing the active compositions of Formula (I), metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1 M and 3 M. The relative molar quantities of metal salts can be selected based on a specific target Formula (I), i.e. specific values of a, b, x and y etc. in Formula (I) Similarly, the optional dopant elements in ".D" moiety of Formula (I) can be introduced along with the other metal salts (Mn, Ni and Co) at the appropriate molar quantity such that the dopant is incorporated into the precipitated material. The pH of the solution can then be adjusted, such as with the addition of $Na_2CO_3$ and/or ammonium hydroxide (preferably free of ammonium), to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, and washed prior to further processing. A person of ordinary skill in the art will recognize that additional ranges of process parameters within the explicit ranges above are contemplated and are within the present invention.

The collected metal hydroxide or carbonate powder can then be subjected to a heat treatment to convert the hydroxide or carbonate composition to the corresponding oxide composition with the elimination of water or carbon dioxide. A fluoride, such as $MgF_2$, can be added to introduce a fluoride dopant. Generally, the heat treatment can be performed in an oven, furnace or the like. The heat treatment can be performed in an atmosphere with oxygen present. In some embodiments, the material can be heated to a temperature of at least about 350° C., or from about 400° C. to about 800° C. to convert the hydroxide or carbonate to an oxide. The heat treatment generally can be performed for at least about 15 minutes, from about 30 minutes to 24 hours or longer, and from about 45 minutes to about 15 hours. A further heat treatment can be performed to improve the crystallinity of the product material. This calcination step for forming the crystalline product generally is performed at temperatures of at least about 650° C., from about 700° C. to about 1200° C., or from about 700° C. to about 1100° C. The calcination step to improve the structural properties of the powder generally can be performed for at least about 15 minutes, from about 20 minutes to about 30 hours or longer, or from about 1 hour to about 36 hours. The heating steps can be combined, if desired, with appropriate ramping of the temperature to yield desired compositions of Formula (I). A person of ordinary skill in the art will recognize that additional ranges of temperatures and times within the explicit ranges above are contemplated and are within the present invention.

The lithium element in Formula (I) can be incorporated into the composition at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as LiOH.H2O, LiOH, Li2CO3, or a combination thereof, can be mixed with the precipitated metal carbonate or metal hydroxide. The powder mixture is then advanced through the heating step(s) to form the oxide and then the crystalline final product composition of Formula (I).

As briefly mentioned above, inorganic coatings *C moiety in Formula (I), such as metal fluoride coatings and metal oxide coatings, have been found to significantly improve the performance of the active compositions of Formula (I), although the coatings *C are believed to be inert with respect to battery cycling. The cycling properties of the batteries formed from active compositions of Formula (I) including *C have been found to significantly improve from the uncoated counterpart. The specific capacity of the batteries also shows desirable properties with the coatings, and the irreversible capacity loss of the first cycle of the battery can be reduced. The first cycle irreversible capacity loss of a battery is the difference between the charge capacity of the new battery and its first discharge capacity.

In general, the coatings *C moiety in Formula (I) can have an average thickness of no more than 25 nm, from about 0.5 nm to about 20 nm, from about 1 nm to about 12 nm, from 1.25 nm to about 10 nm, or from about 15 nm to about 8 nm.

For example, a metal fluoride *C coating in Formula (I) can be deposited using a solution based precipitation approach. A powder of the active compositions of Formula (I) without *C can be mixed in a suitable solvent, such as an aqueous solvent. A soluble composition of the desired metal/metalloid can be dissolved in the solvent. Then, NH4F can be gradually added to the dispersion/solution to precipitate the metal fluoride. The total amount of coating reactants can be selected to form the desired thickness of coating, and the ratio of coating reactants can be based on the stoichiometry of the coating material *C. The material can be dried and heated to temperatures generally from about 250° C. to about 600° C. for about 20 minutes to about 48 hours to complete the formation of the coated material, i.e. active composition of Formula (I) with *C.

In contrast, an oxide coating *C in Formula (I) is generally formed through the deposition of a precursor coating onto the powder of Formula (I) without *C. The precursor coating is then heated to form the metal oxide coating. Suitable precursor coating can comprise corresponding metal hydroxides, metal carbonates, metal acetates, or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder of Formula (I) without *C, with a metal nitrate solution, and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hour to about 20 hours. Also, a metal nitrate precursor coating generally can be heated to decompose the coating at a temperature from about 250° C. to about 550° C. for at least about 30 minutes.

In some exemplary embodiments, for the first cycle, a battery is discharged at a rate of C/10 to establish irreversible capacity loss. Then, the battery is cycled for the second cycle at C/5, the third cycle at C/2, from the fourth cycle at 1C and continues for 50 or more cycles at 1C. The notation C/x implies that the battery is discharged at a testing rate to discharge the battery to the selected voltage limit in x hours. For example, the notation C/10 implies that the battery is discharged at a testing rate involving a discharge of the battery over 10 hours, which in conventional notation is written as C/10 or 0.1C. For moderate rate application, a reasonable testing rate involves a discharge of the battery over 1.0 hour, which in conventional notation is written as C/1 or 1C. Another reasonable testing rate involves a discharge of the battery over 2.0 hours, which in conventional notation is written as C/2 or 0.5C.

Typically, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell. The irreversible capacity loss generally can be attributed to changes during the initial charge-discharge cycle of the battery materials that may be substantially maintained during subsequent cycling of the battery.

During charge/discharge measurements, the specific capacity of an active composition of Formula (I) depends on the rate of discharge. The maximum specific capacity of a particular composition of Formula (I) is measured at very slow discharge rates. In actual use, the actual specific capacity is less than the maximum due to discharge at a finite rate. More realistic specific capacities can be measured using reasonable rates of discharge that are more similar to the rates during use. For low to moderate rate applications, a reasonable testing rate involves a discharge of the battery over three hours. In conventional notation this is written as C/3 or 0.33C, and other charge and discharge rates can be written in this notation.

The electrode active compositions of Formula (I) can exhibit a specific discharge capacity of:

at least about 215 to 275 mAh/g and in some embodiments at least about 290 mAh/g at a discharge rate of 0.1C when discharged from 4.8V to 2.0V;

at least about 195 to 240 mAh/g and in some embodiments at least about 250 mAh/g at a discharge rate of 0.2C when discharged from 4.6V to 2.0V after the first cycle at 0.1C rate and between 4.8V and 2.0V;

at least about 185 to 225 mAh/g and in some embodiments at least about 230 mAh/g at a discharge rate of 0.2C when discharged from 4.45V to 2.0V after the first cycle at 0.1C rate and between 4.8V and 2.0V; and/or at least about 180 to 210 mAh/g and in some embodiments at least about 220 mAh/g at a discharge rate of 0.2C when discharged from 4.35V to 2.0V after the first cycle at 0.1C rate and between 4.8V and 2.0V.

The electrode active compositions of Formula (I) can be used to construct batteries that have cycling performance comparable to NCM523, including high specific capacity, high overall capacity, low DC-resistance and excellent rate capability. The resulting lithium ion batteries can be used as an improved power source, particularly for high energy applications, such as electric vehicles, plug in hybrid electric vehicles and the like. The active compositions of Formula (I)

exhibit a relatively high average voltage over a discharge cycle so that the batteries can have high power output along with a high specific capacity. Some active compositions of Formula (I) can have an appropriate coating to provide for an improvement in cycling as well as potentially a reduction in irreversible capacity loss and an increase in specific capacity.

Rechargeable batteries using active compositions of Formula (I) have a range of uses, such as mobile communication devices, e.g. phones, mobile entertainment devices, such as MP3 players and televisions, portable computers, combinations of these devices that are finding wide use, as well as transportation devices, such as automobiles and fork lifts. The batteries using active compositions of Formula (I) may also be suitable for vehicle applications. In particular, these batteries can be used in battery packs for hybrid vehicles, plug-in hybrid vehicles and purely electric vehicles. These vehicles generally have a battery pack that is selected to balance weight, volume and capacity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Comparative Example 1 (Sample CS1) y=0

Stoichiometry amounts of $Li_{1.43}Mn_{0.715}Ni_{0.285}O_{2.43}$ precursors $MnSO_4.H_2O$ and $NiSO_4.6H_2O$ were dissolved in deionized water to form an aqueous solution with the metal salts in the desired molar ratios and obtain the first solution of 2.0 M mixed metal ions. 2 M $Na_2CO_3$ was the second solution free of $NH_3.H_2O$. Both solutions were slowly pumped into a continuously stirred reactor. The pH value of the solution in reactor was kept at around 8.8. After 1 hour of reaction, the precursor precipitate was washed with deionized water for several times and filtered to product wet $Mn_{0.715}Ni_{0.285}CO_3$ slurry. Stoichiometry amounts of $LiOH.H_2O$ was mixed thoroughly and grinned with the wet slurry to product a mixture. The obtained mixture was dried at 110° C. for 12 hours, and then sintered at 500° C. for 6 hours before continuing sintered at 900° C. in air for 12 hours to produce active cathode material comparative "Sample CS1" with approximate formula $Li_{1.43}Mn_{0.715}Ni_{0.285}O_{2.43}$.

Comparative Example 2 (Sample CS2) y=0.12

Stoichiometry amounts of Li1.43Mn0.715Ni0.285O2.43.Li0.046Co0.046O0.092 precursors $MnSO_4.H_2O$ and $NiSO_4.6H_2O$ were dissolved in deionized water to form an aqueous solution with the metal salts in the desired molar ratios and obtain the first solution of 2.0 M mixed metal ions. 2M $Na_2CO_3$ was the second solution free of $NH_3.H_2O$. Both solutions were slowly pumped into a continuously stirred reactor. The pH value of the solution in reactor was kept at around 8.8. After around 1 hour of reaction, the precursor precipitate was washed with deionized water for several times and filtered to product wet Mn0.715Ni0.285CO3 slurry. Stoichiometry amounts of LiOH.H2O and doping compounds Co3O4 were mixed thoroughly and grinned with the wet slurry to produce a mixture. The obtained mixture was dried at 110° C. for 12 hours, and then sintered at 500° C. for 6 hours before continuing sintered at 900° C. in air for 12 hours to produce active cathode material Comparative "Sample CS2") with an approximate formula Li1.43Mn0.715Ni0.285O2.43.Li0.12Co0.12O0.24.

Comparative Example 3: $LiNi_{0.5}Co_{0.2}Mn_{0.3}O_2$ ("NCM523") y=0.25

The sample may be prepared a manner similar to the procedure as described in Comparative Examples 1 and 2. Alternatively, the sample may be commercially obtained as NCM523.

Example 1: Formula (I) Wherein x=0.43, y=0.046, a=0.715, b=0.285, a/b=2.5 and Both C and D are Absent (Sample S1)

Stoichiometry amounts of Li1.43Mn0.715Ni0.285O2.43.Li0.046Co0.046O0.092 precursors MnSO4.H2O and NiSO4.6H2O were dissolved in deionized water to form an aqueous solution with the metal salts in the desired molar ratios and obtain the first solution of 2.0 M mixed metal ions. 2M $Na_2CO_3$ was the second solution free of $NH_3H_2O$. Both solutions were slowly pumped into a continuously stirred reactor. The pH value of the solution in reactor was kept at around 8.8. After around 1 hour of reaction, the precursor precipitate was washed with deionized water for several times and filtered to produce wet Mn0.715Ni0.285CO3 slurry. Stoichiometry amounts of LiOH.H2O and doping compound Co3O4 were mixed thoroughly and grinned with the wet slurry to produce a mixture. The obtained mixture was dried at 110° C. for 12 h, and then sintered at 500° C. for 6 hours before continuing sintered at 900° C. in air for 12 hours to produce active cathode material "Sample S1" with approximate formula Li1.43Mn0.715Ni0.285O2.430.Li0.046Co0.046O0.092.

Example 2: Formula (I) Wherein x=0.43, y=0.046, a=0.715, b=0.285, a/b=2.5, D is Li0.045Ti0.021O0.063, and C is Absent (Sample S2)

Stoichiometry amounts of Li1.43Mn0.715Ni0.285O2.43.Li0.046Co0.046O0.092.Li0.045Ti0.021O0.063, precursors MnSO4.H2O and NiSO4.6H2O were dissolved in deionized water to form an aqueous solution with the metal salts in the desired molar ratios and obtain the first solution of 2.0 M mixed metal ions. 2 M Na2CO3 was the second solution free of NH3.H2O. Both solutions were slowly pumped into a continuously stirred reactor. The pH value of the solution in reactor was kept at around 8.8. After around 1 hour of reaction, the precursor precipitate was washed with deionized water for several times and filtered to product wet Mn0.715Ni0.285CO3 slurry. Stoichiometry amounts of LiOH.H2O doping compounds Co3O4 and TiO2 were mixed thoroughly and grinned with the wet slurry to produce a mixture. The obtained mixture was dried at 110° C. for 12 h, and then sintered at 500° C. for 6 hours before continuing sintered at 900° C. in air for 12 hours to produce active cathode material "Sample S2" with approximate formula Li1.43Mn0.715Ni0.285O2.43.Li0.046Co0.046O0.092.Li0.045Ti0.021O0.063.

Example 3: Formula (I) Wherein x=0.43, y=0.046, a=0.715, b=0.285, a/b=2.5, D is Li0.045Ti0.021O0.063, and C is Al0.039O0.058 (Sample S3)

Stoichiometry amounts of Li1.43Mn0.715Ni0.285O2.43.Li0.046Co0.046O0.092.Li0.045Ti0.021O0.063, precursors MnSO4.H2O and NiSO4.6H2O were dissolved in deionized water to form an aqueous solution with the metal salts in the desired molar ratios and obtain the first solution of 2.0 M mixed metal ions. 2 M Na2CO3 was the second solution free of NH3H2O. Both solutions were slowly pumped into a continuously stirred reactor. The pH value of the solution in reactor was kept at around 8.8. After around 1 hour of reaction, the precursor precipitate was washed with deionized water for several times and filtered to produce wet Mn0.715Ni0.285CO3 slurry Stoichiometry amounts of LiOH.H2O and doping compounds Co3O4 and TiO2 were mixed thoroughly and grinned with the wet slurry to produce a mixture. The obtained mixture was dried at 110° C. for 12 hours, and then sintered at 500° C. for 6 hours before continuing sintered at 900° C. in air for 12 hours to produce active cathode material sample with approximate formula Li1.43Mn0.715Ni0.285O2.43.Li0.046Co0.046O0.092.Li0.045Ti0.021O0.063 Stoichiometry amount of coating agent Al(NO3)3.9H2O was dissolved in deionized water, then mixed thoroughly with the active cathode material sample. The obtained mixture was dried at 110° C. for 8 hours, and then sintered at 500° C. for 6 hours in air to produce coated active cathode material "Sample S3" with approximate formula Li1.43Mn0.715Ni0.285O2.43.Li0.046Co0.046O0.092.Li0.045Ti0.021O0.063*Al0.039O0.058.

Example 4: Formula (I) Wherein x=0.43, y=0.046, a=0.715, b=0.285, a/b=2.5, D is Li0.045Ti0.021O0.063, and C is Al0.039F0.12 (Sample S4)

Stoichiometry amounts of Li1.43Mn0.715Ni0.285O2.43.Li0.046Co0.046O0.092.Li0.045Ti0.021O0.063 precursors MnSO4.H2O and NiSO4.6H2O were dissolved in deionized water to form an aqueous solution with the metal salts in the desired molar ratios and obtain the first solution of 2.0 M mixed metal ions. 2 M Na2CO3 was the second solution free of NH3.H2O. Both solutions were slowly pumped into a continuously stirred reactor. The pH value of the solution in reactor was kept at around 8.8. After around 1 hour of reaction, the precursor precipitate was washed with deionized water for several times and filtered to produce wet Mn0.715Ni0.285CO3 slurry. Stoichiometry amounts of LiOH.H2O and doping compounds Co3O4 and TiO2 were mixed thoroughly and grinned with the wet slurry to product a mixture. The obtained mixture was dried at 110° C. for 12 hours, and then sintered at 500° C. for 6 hours before continuing sintered at 900° C. in air for 12 hours to produce active cathode material with approximate formula Li1.43Mn0.715Ni0.285O2.43.Li0.046Co0.046O0.092.Li0.045Ti0.021O0.063. Stoichiometry amount of coating agent Al(NO3)3.9H2O and NH4F were dissolved in deionized water separately, Al(NO3)3.9H2O solution was mixed thoroughly with the active cathode material first, then NH4F was mixed thoroughly. The obtained mixture was dried at 110° C. for 6 hours, and then sintered at 500° C. for 6 hours in air, to produce coated active cathode material "Sample S4" with approximate formula Li1.43Mn0.715Ni0.285O2.43.Li0.046Co0.046O0.092.Li0.045Ti0.021O0.063*Al0.039F0.12.

Example 5: Formula (I) Wherein x=0.4, y=0.034, a=0.715, b=0.285, a/b=2.5, D is Sn0.01O0.02, and C is Absent (Sample S5)

Stoichiometry amounts of Li1.4Mn0.715Ni0.285O2.4.Li0.034Co0.034O0.068.Sn0.01O0.02 precursors MnSO4.H2O, NiSO4.6H2O, and CoSO4.7H2O were dissolved in deionized water to form an aqueous solution with the metal salts in the desired molar ratios and obtain the first solution of 2.0 M mixed metal ions. 2 M Na2CO3 was the second solution free of NH3.H2O. Both solutions were slowly pumped into a continuously stirred reactor. The pH value of the solution in reactor was kept at around 8.8. After around 1 hour of reaction, the precursor precipitate was washed with deionized water for several times and filtered to product wet Mn0.715Ni0.285CO3Co0.046(CO3)0.046 slurry. Stoichiometry amounts of Li2CO3 and doping compound SnCl2 were mixed thoroughly and grinned with the wet slurry to produce a mixture. The obtained mixture was dried at 110° C. for 12 hours, and then sintered at 500° C. for 6 hours before continuing sintered at 900° C. in air for 12 hours to produce active cathode material "Sample S5" with approximate formula Li1.4Mn0.715Ni0.285O2.4.Li0.034Co0.034O0.068.Sn0.01O0.02.

Example 6: Formula (I) Wherein x=0.4, y=0.034, a=0.715, b=0.285, a/b=2.5, D is Sn0.01O0.02, and C is Al0.039O0.058 (Sample S6)

Stoichiometry amounts of Li1.4Mn0.715Ni0.285O2.4.Li0.034Co0.034O0.068.Sn0.01O0.02. precursors MnSO4.H2O, NiSO4.6H2O, and CoSO4.7H2O were dissolved in deionized water to form an aqueous solution with the metal salts in the desired molar ratios and obtain the first solution of 2.0 M mixed metal ions. 2 M Na2CO3 was the second solution free of NH3.H2O. Both solutions were slowly pumped into a continuously stirred reactor. The pH value of the solution in reactor was kept at around 8.8. After around 1 hour of reaction, the precursor precipitate was washed with deionized water for several times and filtered to produce wet Mn0.715Ni0.285CO3Co0.046(CO3)0.046 slurry. Stoichiometry amounts of Li2CO3 and doping compound SnCl2 were mixed thoroughly and grinned with the wet slurry to product a mixture. The obtained mixture was dried at 110° C. for 12 hours, and then sintered at 500° C. for 6 hours before continuing sintered at 900° C. in air for 12 hours to produce active cathode material with approximate formula Li1.4Mn0.715Ni0.285O2.4.Li0.034Co0.034O0.068.Sn0.01O0.02. Stoichiometry amount of coating agent Al(NO3)3.9H2O was dissolved in deionized water, then mixed thoroughly with the active cathode material sample. The obtained mixture was dried at 110° C. for 8 h, and then sintered at 500° C. for 6 hours in air to produce coated active cathode material "Sample S6" with approximate formula Li1.4Mn0.715Ni0.285O2.4.Li0.034Co0.034O0.068.Sn0.01 O0.02*Al0.039O0.058.

Example 7: Formula (I) Wherein x=0.4, y=0.034, a=0.715, b=0.285, a/b=2.5, D is Sn0.01O0.02, and C is Al0.039F0.12 (Sample S7)

Stoichiometry amounts of Li1.4Mn0.715Ni0.285O2.4.Li0.034Co0.034O0.068.Sn0.01 O0.02 precursors MnSO4.H2O, NiSO4.6H2O, and CoSO4.7H2O were dissolved in deionized water to form an aqueous solution with the metal salts in the desired molar ratios and obtain the first solution of 2.0 M mixed metal ions. 2 M Na2CO3 was the second solution free of NH3H2O. Both solutions were slowly pumped into a continuously stirred reactor. The pH value of the solution in reactor was kept at around 8.8. After around 1 hour of reaction, the precursor precipitate was washed with deionized water for several times and filtered to product wet Mn0.715Ni0.285CO3Co0.046(CO3)0.046 slurry. Stoichiometry amounts of Li2CO3 and doping compound SnCl2 were mixed thoroughly and grinned with the wet slurry to produce a mixture. The obtained mixture was dried at 110° C. for 12 hours, and then sintered at 500° C. for 6 hours before continuing sintered at 900° C. in air for 12 hours to produce active cathode material sample with approximate formula Li1.4Mn0.715Ni0.285O2.4.Li0.034Co0.034O0.068.Sn0.01 O0.02. Stoichiometry amount of coating agent Al(NO3)3.9H2O and NH4F were dissolved in deionized water separately, Al(NO3)3.9H2O solution was mixed thoroughly with the active cathode material sample first, then NH4F was mixed thoroughly. The obtained mixture was dried at 110° C. for 6 hours, and then sintered at 500° C. for 6 hours in air, to produce coated active cathode material "Sample S7" with approximate formula Li1.4Mn0.715Ni0.285O2.4.Li0.034Co0.034O0.068.Sn0.01 O0.02*Al0.039F0.12.

Example 8: Formula (I) Wherein x=0.4, y=0.034, a=0.715, b=0.285, a/b=2.5, D is Sn0.01O0.02, and C is Li0.01V0.01O0.03 (Sample S8)

Stoichiometry amounts of Li1.4Mn0.715Ni0.285O2.4.Li0.034Co0.034O0.068.Sn0.01 O0.02 precursors MnSO4.H2O, NiSO4.6H2O, and CoSO4.7H2O were dissolved in deionized water to form an aqueous solution with the metal salts in the desired molar ratios and obtain the first solution of 2.0 M mixed metal ions. 2 M Na2CO3 was the second solution free of NH3H2O. Both solutions were slowly pumped into a continuously stirred reactor. The pH value of the solution in reactor was kept at around 8.8. After around 1 hour of reaction, the precursor precipitate was washed with deionized water for several times and filtered to product wet. Mn0.715Ni0.285CO3Co0.046(CO3)0.046 slurry. Stoichiometry amounts of Li2CO3 and doping compound SnCl2 were mixed thoroughly and grinned with the wet slurry to produce a mixture. The obtained mixture was dried at 110° C. for 12 hours, and then sintered at 500° C. for 6 hours before continuing sintered at 900° C. in air for 12 hours to produce active cathode material sample Li1.4Mn0.715Ni0.285O2.4.Li0.034Co0.034O0.068.Sn0.01 O0.02. Stoichiometry amount of coating agent NH4VO3 was dissolved in deionized water, and then mixed thoroughly with the active cathode material sample. The obtained mixture was dried at 110° C. for 8 hours, and then sintered at 500° C. for 6 hours in air to produce coated active cathode material "Sample S8" with approximate formula Li1.4Mn0.715Ni0.285O2.4.Li0.034Co0.034O0.068.Sn0.01 O0.02*Li0.01V0.01O0.03.

The active compositions of Example 1-8 are summarized in Table 1 below.

TABLE 1

| Ex. | Formula (I) wherein . . . |
|---|---|
| 1 | x = 0.43, y = 0.046, a = 0.715, b = 0.285, a/b = 2.5 and both C and D are absent; |
| (S1) | i.e. Li1.43Mn0.715Ni0.285O2.43•Li0.046Co0.046O0.092 |
| 2 | x = 0.43, y = 0.046, a = 0.715, b = 0.285, a/b = 2.5, D is Li0.045Ti0.021O0.063, C is absent; |
| (S2) | i.e. Li1.43Mn0.715Ni0.285O2.43•Li0.046Co0.046O0.092•Li0.045Ti0.021O0.063 |
| 3 | x = 0.43, y = 0.046, a = 0.715, b = 0.285, a/b = 2.5, D is Li0.045Ti0.021O0.063, and C is Al0.039O0.058; |
| (S3) | i.e. Li1.43Mn0.715Ni0.285O2.43•Li0.046Co0.046O0.092•Li0.045Ti0.021O0.063 *Al0.039O0.058 |
| 4 | x = 0.43, y = 0.046, a = 0.715, b = 0.285, a/b = 2.5, D is Li0.045Ti0.021O0.063, and C is Al0.039F0.12; |
| (S4) | i.e. Li1.43Mn0.715Ni0.285O2.43•Li0.046Co0.046O0.092•Li0.045Ti0.021O0.063*Al0.039F0.12 |
| 5 | x = 0.4, y = 0.034, a = 0.715, b = 0.285, a/b = 2.5, D is Sn0.01O0.02, and C is absent |
| (S5) | i.e. Li1.4Mn0.715Ni0.285O2.4•Li0.034Co0.034O0.068•Sn0.01O0.02 |
| 6 | x = 0.4, y = 0.034, a = 0.715, b = 0.285, a/b = 2.5, D is Sn0.01O0.02, and C is Al0.039O0.058; |
| (S6) | i.e. Li1.4Mn0.715Ni0.285O2.4•Li0.034Co0.034O0.068•Sn0.01O0.02*Al0.039O0.058 |
| 7 | x = 0.4, y = 0.034, a = 0.715, b = 0.285, a/b = 2.5, D is Sn0.01O0.02, and C is Al0.039F0.12; |
| (S7) | i.e. Li1.4Mn0.715Ni0.285O2.4•Li0.034Co0.034O0.068•Sn0.01O0.02*Al0.039F0.12 |
| 8 | x = 0.4, y = 0.034, a = 0.715, b = 0.285, a/b = 2.5, D is Sn0.01O0.02, and C is Li0.01V0.01O0.03; |
| (S8) | i.e. Li1.4Mn0.715Ni0.285O2.4•Li0.034Co0.034O0.068•Sn0.01O0.02*Li0.01V0.01O0.03 |

Examples 9-60

Using the methods similar to those in Examples 1-8, the electrode active compositions represented by Formula (I) in Table 2 were also synthesized. Other electrode active compositions that fall within and outside the scope defined by Formula (I) have also been prepared using the methods similar to those described in Examples 1-8.

TABLE 2

| Ex. | Formula (I) wherein . . . |
|---|---|
| 9 | $x = 0.4$, $y = 0.045$, $a = 0.688$, $b = 0.312$, $a/b = 2.2$, D is $Li_{0.03}V_{0.03}O_{0.09}$, C is absent<br>$Li_{1.40}Mn_{0.688}Ni_{0.312}O_{2.40} \bullet Li_{0.045}Co_{0.045}O_{0.09} \bullet Li_{0.03}V_{0.03}O_{0.09}$ |
| 10 | $x = 0.4$, $y = 0.045$, $a = 0.688$, $b = 0.312$, $a/b = 2.2$, D is $Li_{0.03}V_{0.03}O_{0.09}$, C is $Zn_{0.07}O_{0.07}$<br>$Li_{1.40}Mn_{0.688}Ni_{0.312}O_{2.40} \bullet Li_{0.045}Co_{0.045}O_{0.09} \bullet Li_{0.03}V_{0.03}O_{0.09} * Zn_{0.07}O_{0.07}$ |
| 11 | $x = 0.4$, $y = 0.045$, $a = 0.688$, $b = 0.312$, $a/b = 2.2$, D is $Li_{0.03}V_{0.03}O_{0.09}$, C is $Li_{0.05}Al_{0.05}O_{0.1}$;<br>i.e. $Li_{1.40}Mn_{0.688}Ni_{0.312}O_{2.40} \bullet Li_{0.045}Co_{0.045}O_{0.09} \bullet Li_{0.03}V_{0.03}O_{0.09} * Li_{0.05}Al_{0.05}O_{0.1}$ |
| 12 | $x = 0.4$, $y = 0.03$, $a = 0.688$, $b = 0.312$, $a/b = 2.2$, D is $Li_{0.03}V_{0.03}O_{0.09}$, C is $Al_{0.05}F_{0.15}$<br>$Li_{1.40}Mn_{0.688}Ni_{0.312}O_{2.40} \bullet Li_{0.03}Co_{0.03}O_{0.06} \bullet Li_{0.03}V_{0.03}O_{0.09} * Al_{0.05}F_{0.15}$ |
| 13 | $x = 0.4$, $y = 0.03$, $a = 0.688$, $b = 0.312$, $a/b = 2.2$, D is $Li_{0.03}V_{0.03}O_{0.09}$, C is $Ca_{0.05}F_{0.1}$<br>$Li_{1.40}Mn_{0.688}Ni_{0.312}O_{2.40} \bullet Li_{0.03}Co_{0.03}O_{0.06} \bullet Li_{0.03}V_{0.03}O_{0.09} * Ca_{0.05}F_{0.1}$ |
| 14 | $x = 0.375$, $y = 0.03$, $a = 0.688$, $b = 0.312$, $a/b = 2.2$, D is absent, C is $Ca_{0.05}F_{0.1}$<br>$Li_{1.375}Mn_{0.688}Ni_{0.312}O_{2.375} \bullet Li_{0.03}Co_{0.03}O_{0.06} * Ca_{0.05}F_{0.1}$ |
| 15 | $x = 0.375$, $y = 0.03$, $a = 0.688$, $b = 0.312$, $a/b = 2.2$, D is absent, C is $Li_{0.06}(PO_4)_{0.02}$<br>$Li_{1.375}Mn_{0.688}Ni_{0.312}O_{2.375} \bullet Li_{0.03}Co_{0.03}O_{0.06} * Li_{0.06}(PO_4)_{0.02}$ |
| 16 | $x = 0.375$, $y = 0.03$, $a = 0.688$, $b = 0.312$, $a/b = 2.2$, D is absent, C is $Li_{0.05}V_{0.05}O_{0.15}$<br>$Li_{1.375}Mn_{0.688}Ni_{0.312}O_{2.375} \bullet Li_{0} 03Co_{0.03}O_{0.06} * Li_{0.05}V_{0.05}O_{0.15}$ |
| 17 | $x = 0.375$, $y = 0.03$, $a = 0.688$, $b = 0.312$, $a/b = 2.2$, D is absent, C is $Al_{0.05}F_{0.15}$<br>$Li_{1.375}Mn_{0.688}Ni_{0.312}O_{2.375} \bullet Li_{0.03}Co_{0.03}O_{0.06} * Al_{0.05}F_{0.15}$ |
| 18 | $x = 0.375$, $y = 0.03$, $a = 0.688$, $b = 0.312$, $a/b = 2.2$, D is absent, C is $Zn_{0.05}O_{0.05}$<br>$Li_{1.375}Mn_{0.688}Ni_{0.312}O_{2.375} \bullet Li_{0.03}Co_{0.03}O_{0.06} * Zn_{0.05}O_{0.05}$ |
| 19 | $x = 0.375$, $y = 0.03$, $a = 0.688$, $b = 0.312$, $a/b = 2.2$, D is absent, C is $Li_{0.05}Al_{0.05}O_{0.1}$<br>$Li_{1.375}Mn_{0.688}Ni_{0.312}O_{2.375} \bullet Li_{0.03}Co_{0.03}O_{0.06} * Li_{0.05}Al_{0.05}O_{0.1}$ |
| 20 | $x = 0.375$, $y = 0.03$, $a = 0.688$, $b = 0.312$, $a/b = 2.2$, D is absent, C is $Li_{0.15}B_{0.05}O_{0.1}$<br>$Li_{1.375}Mn_{0.688}Ni_{0.312}O_{2.375} \bullet Li_{0.03}Co_{0.03}O_{0.06} * Li_{0.15}B_{0.05}O_{0.1}$ |
| 21 | $x = 0.375$, $y = 0.03$, $a = 0.688$, $b = 0.312$, $a/b = 2.2$, D is absent, C is $Li_{0.05}Nb_{0.05}O_{0.15}$<br>$Li_{1.375}Mn_{0.688}Ni_{0.312}O_{2.375} \bullet Li_{0.03}Co_{0.03}O_{0.06} * Li_{0.05}Nb_{0.05}O_{0.15}$ |
| 22 | $x = 0.375$, $y = 0.03$, $a = 0.688$, $b = 0.312$, $a/b = 2.2$, D is absent, C is $Li_{0.1}Mo_{0.05}O_{0.2}$<br>$Li_{1.375}Mn_{0.688}Ni_{0.312}O_{2.375} \bullet Li_{0.03}Co_{0.03}O_{0.06} * Li_{0.1}Mo_{0.05}O_{0.2}$ |
| 23 | $x = 0.375$, $y = 0.03$, $a = 0.688$, $b = 0.312$, $a/b = 2.2$, D is absent, C is $Zr_{0.05}O_{0.1}$<br>$Li_{1.375}Mn_{0.688}Ni_{0.312}O_{2.375} \bullet Li_{0.03}Co_{0.03}O_{0.06} * Zr_{0.05}O_{0.1}$ |
| 24 | $x = 0.375$, $y = 0.03$ $a = 0.688$, $b = 0.312$, $a/b = 2.2$, D is absent, C is $Li_{0.05}W_{0.05}O_{0.2}$<br>$Li_{1.375}Mn_{0.688}Ni_{0.312}O_{2.375} \bullet Li_{0.03}Co_{0.03}O_{0.06} * Li_{0.05}W_{0.05}O_{0.2}$ |
| 25 | $x = 0.375$, $y = 0.03$, $a = 0.63$, $b = 0.37$, $a/b = 1.7$, $D*C = Li_{0.1}Mo_{0.05}O_{0.2} * Ca_{0.03}F_{0.06}$<br>$Li_{1.375}Mn_{0.63}Ni_{0.37}O_{2.375} \bullet Li_{0.03}Co_{0.03}O_{0.06} * Li_{0.1}Mo_{0.05}O_{0.2} \bullet Ca_{0.03}F_{0.06}$ |
| 26 | $x = 0.375$, $y = 0.03$, $a = 0.63$, $b = 0.37$, $a/b = 1.7$, $D*C = Li_{0.1}Mo_{0.05}O_{0.2} * Li_{0.03}(PO_4)_{0.01}$<br>$Li_{1.375}Mn_{0.63}Ni_{0.312}O_{2.375} \bullet Li_{0.03}Co_{0.03}O_{0.06} \bullet Li_{0.1}Mo_{0.05}O_{0.2} * Li_{0.03}(PO_4)_{0.01}$ |
| 27 | $x = 0.375$, $y = 0.03$, $a = 0.63$, $b = 0.37$, $a/b = 1.7$, $D*C = Li_{0.1}Mo_{0.05}O_{0.2} * Li_{0.03}V_{0.03}O_{0.09}$<br>$Li_{1.375}Mn_{0.63}Ni_{0.37}O_{2.375} \bullet Li_{0.03}Co_{0.03}O_{0.06} \bullet Li_{0.1}Mo_{0.05}O_{0.2} * Li_{0.03}V_{0.03}O_{0.09}$ |
| 28 | $x = 0.375$, $y = 0.03$, $a = 0.63$, $b = 0.37$, $a/b = 1.7$, $D*C = Li_{0.1}Mo_{0.05}O_{0.2} * Al_{0.03}F_{0.09}$<br>$Li_{1.375}Mn_{0.63}Ni_{0.37}O_{2.375} \bullet Li_{0.03}Co_{0.03}O_{0.06} * Li_{0.1}Mo_{0.05}O_{0.2} * Al_{0.03}F_{0.09}$ |
| 29 | $x = 0.375$, $y = 0.03$, $a = 0.63$, $b = 0.37$, $a/b = 1.7$, $D*C = Li_{0.1}Mo_{0.05}O_{0.2} * Zn_{0.05}O_{0.05}$<br>$Li_{1.375}Mn_{0.63}Ni_{0.37}O_{2.375} \bullet Li_{0.03}Co_{0.03}O_{0.06} \bullet Li_{0.1}Mo_{0.05}O_{0.2} * Zn_{0.05}O_{0.05}$ |
| 30 | $x = 0.375$, $y = 0.03$, $a = 0.63$, $b = 0.37$, $a/b = 1.7$, $D*C = Li_{0.1}Mo_{0.05}O_{0.2} * Li_{0.03}Al_{0.03}O_{0.06}$<br>$Li_{1.375}Mn_{0.63}Ni_{0.37}O_{2.375} \bullet Li_{0.03}Co_{0.03}O_{0.06} \bullet Li_{0.1}Mo_{0.05}O_{0.2} * Li_{0.03}Al_{0.03}O_{0.06}$ |
| 31 | $x = 0.375$, $y = 0.023$, $a = 0.63$, $b = 0.37$, $a/b = 1.7$, D is absent, C is $Mg_{0.05}F_{0.1}$<br>$Li_{1.375}Mn_{0.63}Ni_{0.37}O_{2.375} \bullet Li_{0.023}Co_{0.023}O_{0.046} * Mg_{0.05}F_{0.1}$ |
| 32 | $x = 0.375$, $y = 0.023$, $a = 0.63$, $b = 0.37$, $a/b = 1.7$, D is absent, $C = Li_{0.15}B_{0.05}O_{0.15}$<br>$Li_{1.375}Mn_{0.63}Ni_{0.37}O_{2.375} \bullet Li_{0.023}Co_{0.023}O_{0.046} * Li_{0.15}B_{0.05}O_{0.15}$ |
| 33 | $x = 0.375$, $y = 0.023$, $a = 0.63$, $b = 0.37$, $a/b = 1.7$, D is absent, $C = Li_{0.05}Nb_{0.05}O_{0.10}$<br>$Li_{1.375}Mn_{0.63}Ni_{0.37}O_{2.375} \bullet Li_{0.023}Co_{0.023}O_{0.046} * Li_{0.05}Nb_{0.05}O_{0.10}$ |
| 34 | $x = 0.375$, $y = 0.023$, $a = 0.63$, $b = 0.37$, $a/b = 1.7$, D is absent, $C = Li_{0.1}Mo_{0.05}O_{0.20}$<br>$Li_{1.375}Mn_{0.63}Ni_{0.37}O_{2.375} \bullet Li_{0.023}Co_{0.023}O_{0.046} * Li_{0.1}Mo_{0.05}O_{0.20}$ |
| 35 | $x = 0.375$, $y = 0.023$, $a = 0.63$, $b = 0.37$, $a/b = 1.7$, D is absent, $C = Zr_{0.03}O_{0.06}$<br>$Li_{1.375}Mn_{0.63}Ni_{0.37}O_{2.375} \bullet Li_{0.023}Co_{0.023}O_{0.046} * Zr_{0.03}O_{0.06}$ |
| 36 | $x = 0.375$, $y = 0.023$, $a = 0.63$, $b = 0.37$, $a/b = 1.7$, D is absent, $C = Li_{0.08}W_{0.04}O_{0.16}$<br>$Li_{1.375}Mn_{0.63}Ni_{0.37}O_{2.375} \bullet Li_{0.023}Co_{0.023}O_{0.046} * Li_{0.08}W_{0.04}O_{0.16}$ |
| 37 | $x = 0.375$, $y = 0.03$, $a = 0.672$, $b = 0.328$, $a/b = 2.05$, D is absent, C is $Ca_{0.05}F_{0.10}$<br>$Li_{1.375}Mn_{0.672}Ni_{0.328}O_{2.375} \bullet Li_{0.03}Co_{0.03}O_{0.06} * Ca_{0.05}F_{0.10}$ |
| 38 | $x = 0.375$, $y = 0.03$, $a = 0.672$, $b = 0.328$, $a/b = 2.05$, D is absent, C is $Li_{0.15}(PO_4)_{0.05}$<br>$Li_{1.375}Mn_{0.672}Ni_{0.328}O_{2.375} \bullet Li_{0.03}Co_{0.03}O_{0.06} * Li_{0.15}(PO4)_{0.05}$ |
| 39 | $x = 0.375$, $y = 0.03$, $a = 0.672$, $b = 0.328$, $a/b = 2.05$, D is absent, C is $Li_{0.05}V_{0.05}O_{0.15}$<br>$Li_{1.375}Mn_{0.672}Ni_{0.328}O_{2.375} \bullet Li_{0.03}Co_{0.03}O_{0.06} * Li_{0.05}V_{0.05}O_{0.15}$ |
| 40 | $x = 0.375$, $y = 0.03$, $a = 0.672$, $b = 0.328$, $a/b = 2.05$, D is absent, C is $Al_{0.03}F_{0.09}$<br>$Li_{1.375}Mn_{0.672}Ni_{0.328}O_{2.375} \bullet Li_{0.03}Co_{0.03}O_{0.06} * Al_{0.03}F_{0.09}$ |
| 41 | $x = 0.375$, $y = 0.03$, $a = 0.672$, $b = 0.328$, $a/b = 2.05$, D is absent, C is $Zn_{0.05}O_{0.05}$<br>$Li_{1.375}Mn_{0.672}Ni_{0.328}O_{2.375} \bullet Li_{0.03}Co_{0.03}O_{0.06} * Zn_{0.05}O_{0.05}$ |
| 42 | $x = 0.375$, $y = 0.03$, $a = 0.672$, $b = 0.328$, $a/b = 2.05$, D is absent, C is $Li_{0.03}Al_{0.03}O_{0.06}$<br>$Li_{1.375}Mn_{0.672}Ni_{0.328}O_{2.375} \bullet Li_{0.03}Co_{0.03}O_{0.06} * Li_{0.03}Al_{0.03}O_{0.06}$ |
| 43 | $x = 0.375$, $y = 0.03$, $a = 0.672$, $b = 0.328$, $a/b = 2.05$, D is absent, C is $Mg_{0.03}F_{0.06}$<br>$Li_{1.375}Mn_{0.672}Ni_{0.328}O_{2.375} \bullet Li_{0} 03Co_{0.03}O_{0.06} * Mg_{0.03}F_{0.06}$ |
| 44 | $x = 0.375$, $y = 0.03$, $a = 0.672$, $b = 0.328$, $a/b = 2.05$, D is absent, C is $Li_{0.09}B_{0.03}O_{0.09}$<br>$Li_{1.375}Mn_{0.672}Ni_{0.328}O_{2.375} \bullet Li_{0.03}Co_{0.03}O_{0.06} * Li_{0.09}B_{0.03}O_{0.09}$ |

TABLE 2-continued

Ex. Formula (I) wherein . . .

45  x = 0.375, y = 0.03, a = 0.672, b = 0.328, a/b = 2.05, D is absent, C is Li0.03Nb0.03O0.09
    Li1.375Mn0.672Ni0.328O2.375•Li0.03Co0.03O0.06*Li0.03Nb0.03O0.09
46  x = 0.375, y = 0.03, a = 0.672, b = 0.328, a/b = 2.05, D is absent, C is Li0.03Mo0.03O0.12
    Li1.375Mn0.672Ni0.328O2.375•Li0.03Co0.03O0.06*Li0.03Mo0.03O0.12
47  x = 0.375, y = 0.03, a = 0.672, b = 0.328, a/b = 2.05, D is absent, C is Zr0.03O0.06
    Li1.375Mn0.672Ni0.328O2.375•Li0.03Co0.03O0.06*Zr0.03O0.06
48  x = 0.375, y = 0.03, a = 0.672, b = 0.328, a/b = 2.05, D is absent, C is Li0.06W0.03O0.12
    Li1.375Mn0.672Ni0.328O2.375•Li0.03Co0.03O0.06*Li0.06W0.03O0.12
49  x = 0.28, y = 0.03, a = 0.63, b = 0.37, a/b = 1.7, D is absent, C is Ca0.03F0.06
    Li1.28Mn0.63Ni0.37O2.28•Li0.03Co0.03O0.06*Ca0.03F0.06
50  x = 0.28, y = 0.03, a = 0.63, b = 0.37, a/b = 1.7, D is absent, C is Li0.03(PO4)0.01
    Li1.28Mn0.63Ni0.37O2.28•Li0.03Co0.03O0.06*Li0.03(PO4)0.01
51  x = 0.28, y = 0.03, a = 0.63, b = 0.37, a/b = 1.7, D is absent, C is Li0.03V0.03O0.09
    Li1.28Mn0.63Ni0.37O2.28•Li0.03Co0.03O0.06*Li0.03V0.03O0.09
52  x = 0.28, y = 0.03, a = 0.63, b = 0.37, a/b = 1.7, D is absent, C is Al0.03F0.09
    Li1.28Mn0.63Ni0.37O2.28•Li0.03Co0.03O0.06*Al0.03F0.09
53  x = 0.28, y = 0.03, a = 0.63, b = 0.37, a/b = 1.7, D is absent, C is Zn0.05O0.05
    Li1.28Mn0.63Ni0.37O2.28•Li0.03Co0.03O0.06*Zn0.05O0.05
54  x = 0.28, y = 0.03, a = 0.63, b = 0.37, a/b = 1.7, D is absent, C is Li0.03Al0.03O0.06
    Li1.28Mn0.63Ni0.37O2.28•Li0.03Co0.03O0.06*Li0.03Al0.03O0.06
55  x = 0.28, y = 0.03, a = 0.63, b = 0.37, a/b = 1.7, D is absent, C is Mg0.03F0.06
    Li1.28Mn0.63Ni0.37O2.28•Li0.03Co0.03O0.06*Mg0.03F0.06
56  x = 0.28, y = 0.03, a = 0.63, b = 0.37, a/b = 1.7, D is absent, C is Li0.09B0.03O0.09
    Li1.28Mn0.63Ni0.37O2.28•Li0.03Co0.03O0.06*Li0.09B0.03O0.09
57  x = 0.28, y = 0.03, a = 0.63, b = 0.37, a/b = 1.7, D is absent, C is Li0.03Nb0.03O0.09
    Li1.28Mn0.63Ni0.37O2.28•Li0.03Co0.03O0.06*Li0.03Nb0.03O0.09
58  x = 0.28, y = 0.03, a = 0.63, b = 0.37, a/b = 1.7, D is absent, C is Li0.03Mo0.03O0.12
    Li1.28Mn0.63Ni0.37O2.28•Li0.03Co0.03O0.06*Li0.03Mo0.03O0.12
59  x = 0.28, y = 0.03, a = 0.63, b = 0.37, a/b = 1.7, D is absent, C is Zr0.03O0.06
    Li1.28Mn0.63Ni0.37O2.28•Li0.03Co0.03O0.06*Zr0.03O0.06
60  x = 0.28, y = 0.03, a = 0.63, b = 0.37, a/b = 1.7, D is absent, C is Li0.06W0.03O0.12
    Li1.28Mn0.63Ni0.37O2.28•Li0.03Co0.03O0.06*Li0.06W0.03O0.12

Example 61: Measurements of Electrochemical Properties

The electrochemical properties of the prepared electrode active compositions were measured after assembling them into coin cells (type CR2032) in an argon-filled glove box. The cathode was prepared by spreading a mixture of the active composition (90.0 wt. %), acetylene black (5.0 wt. %), and poly (vinylidene fluoride) binder (5.0 wt %) dissolved in N-methyl pyrrolidone onto an aluminum foil current collector. The cathode was separated from the lithium anode by a separator (Celgard 2502). The electrolyte, consisting of a solution of 1 M LiPF6 in a mixture of ethylene carbonate/dimethyl carbonate. Charge/discharge tests were carried out at 27° C. or 45° C. between 2.0 V and 4.8 V at 0.1C current rate for the first cycle, and at various voltage windows and current densities from the second cycle.

Figure 2:
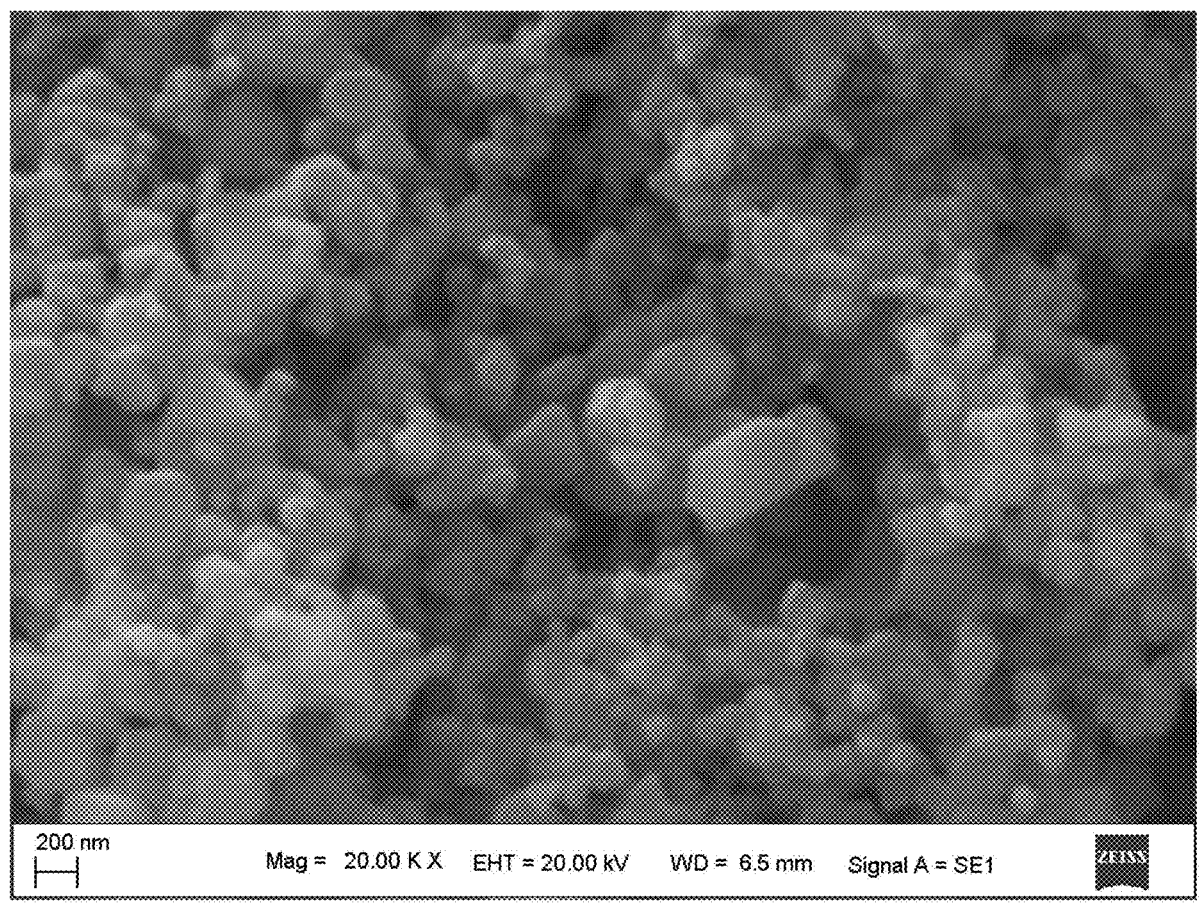
FIG. 2 shows a SEM photo of an active composition of Formula (I), wherein x=0.43, y=0.046, a=0.715, b=0.285, a/b=2.5, D is Li0.045Ti0.021O0.063, and C is absent, in accordance with an exemplary embodiment of the present invention.

Chemical and electrochemical properties of representative electrode active compositions of Formula (I) are illustrated in the following figures and Table 3. FIG. 1 shows an X-ray diffraction (XRD) pattern of Li1.43Mn0.715Ni0.285O2.43.Li0.046Co0.046O0.092.Li0.045Ti0.021O0.063, which is the active compositions of Formula (I) from Example 2 (i.e. Sample "S2"), wherein x=0.43, y=0.046, a=0.715, b=0.285, a/b=2.5, D is Li0.045Ti0.021O0.063, and C is absent. FIG. 1 is a graph of counts (arbitrary units, a.u.) versus diffraction angle (degrees two-θ, 2θ) showing the results of X-ray diffraction analysis of the active compositions of Formula (I) from Example 2. XRD was measured using Cu-Kα rays. FIG. 2 shows a Scanning Electron Microscope (SEM) image of the active composition of Formula (I) from Example 2 (i.e. Sample "S2").

Figure 3:
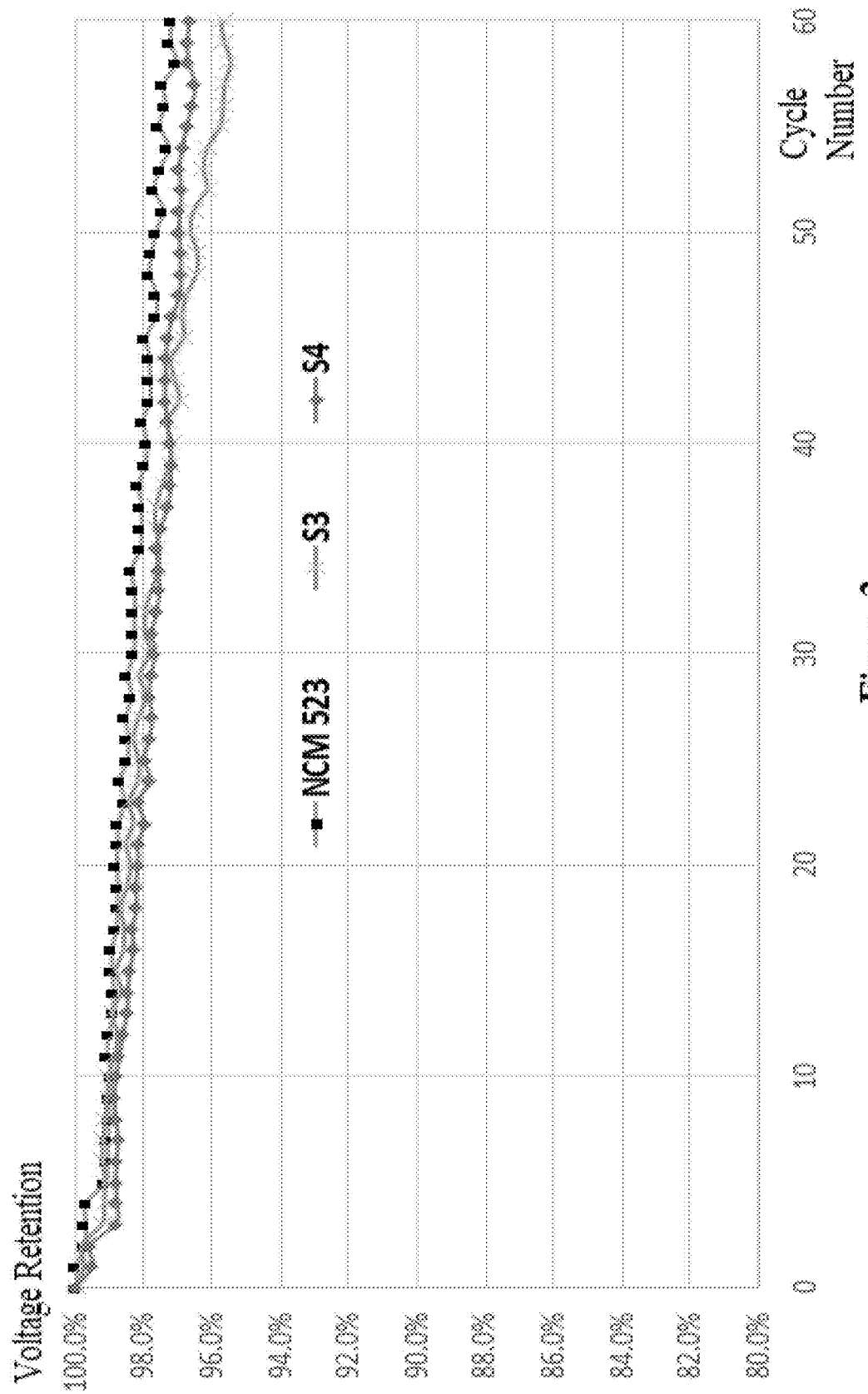
FIG. 3 illustrates the discharge average voltage retention of a battery using two active compositions of Formula (I) as compared to using a commercial product with cycle at 1.0C rate 27° C. and between 2.0-4.30V, in accordance with an exemplary embodiment of the present invention.
Figure 4:
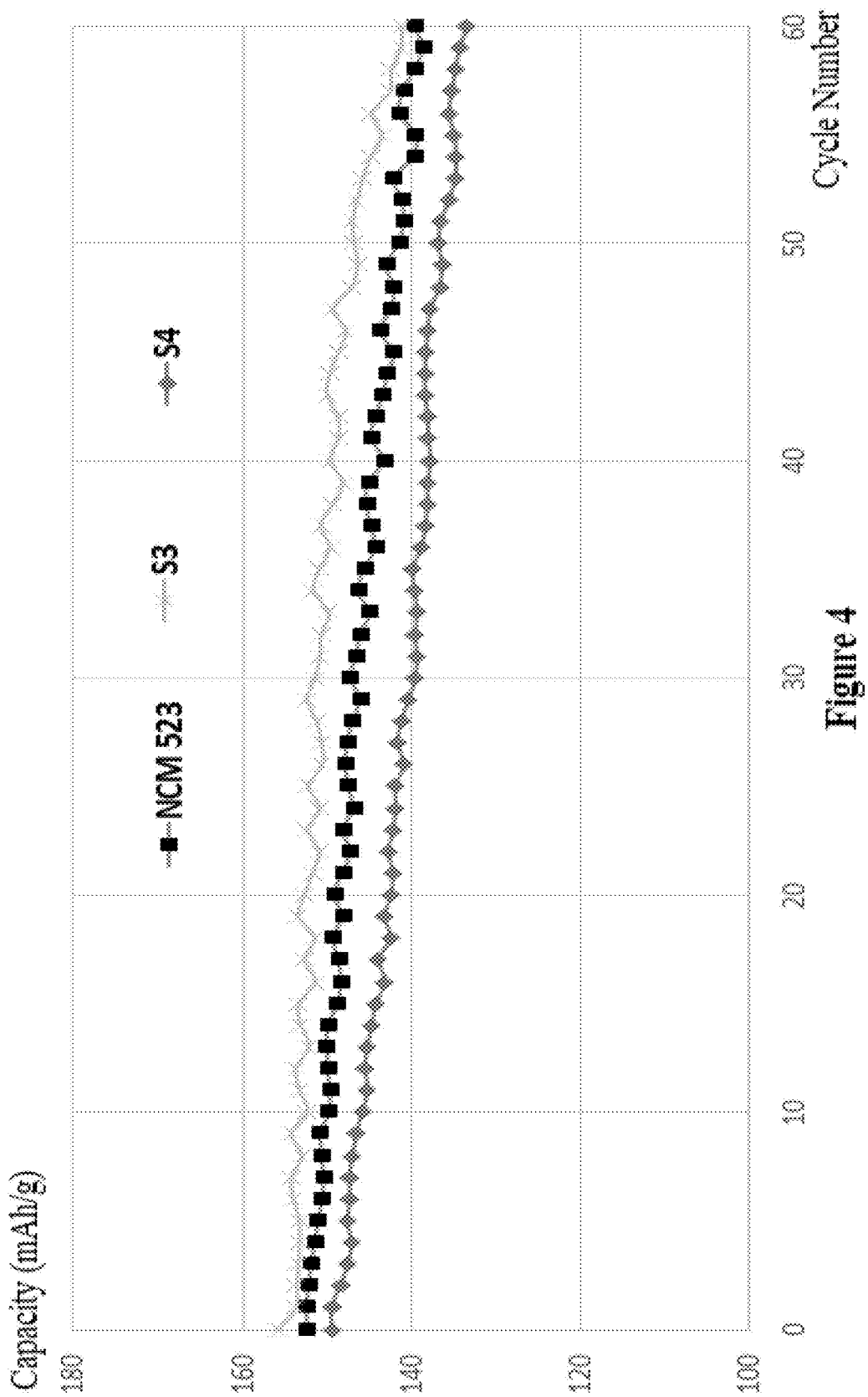
FIG. 4 demonstrates the discharge capacity cycle performance (mAh/g) of a battery using two active compositions of Formula (I) as compared to using a commercial product with cycle at 1.0C rate 27° C. and between 2.0-4.30V in accordance with an exemplary embodiment of the present invention.

FIG. 3 illustrates the voltage retention of samples "S1" and "S2" as compared to sample "NCM523" with cycle at 1.0C rate 27° C. and 2.0-4.30V. As describe above, Sample "S1" is the active composition of Formula (I) from Example 1, wherein x=0.43, y=0.046, a=0.715, b=0.285, a/b=2.5 and both C and D are absent, Li1.43Mn0.715Ni0.285O2.43.Li0.046Co0.046O0.092. Sample "NCM523" is an active composition from Comparative Example 3, LiNi$_{0.5}$Co$_{0.2}$Mn$_{0.3}$O$_2$. Samples "S1" and "S2" contain much less amount Co element, but their voltage retention is comparable to that of sample "NCM523". FIG. 4 shows the capacity cycle performance (mAh/g) of samples "S1" and "S2" as compared to sample "NCM523" at 1.0C Rate, 27° C. and 2.0-4.30 V. Samples "S1" and "S2" contain much less amount Co element, but their capacity cycle performance is comparable to that of sample "NCM523".

Figure 5:
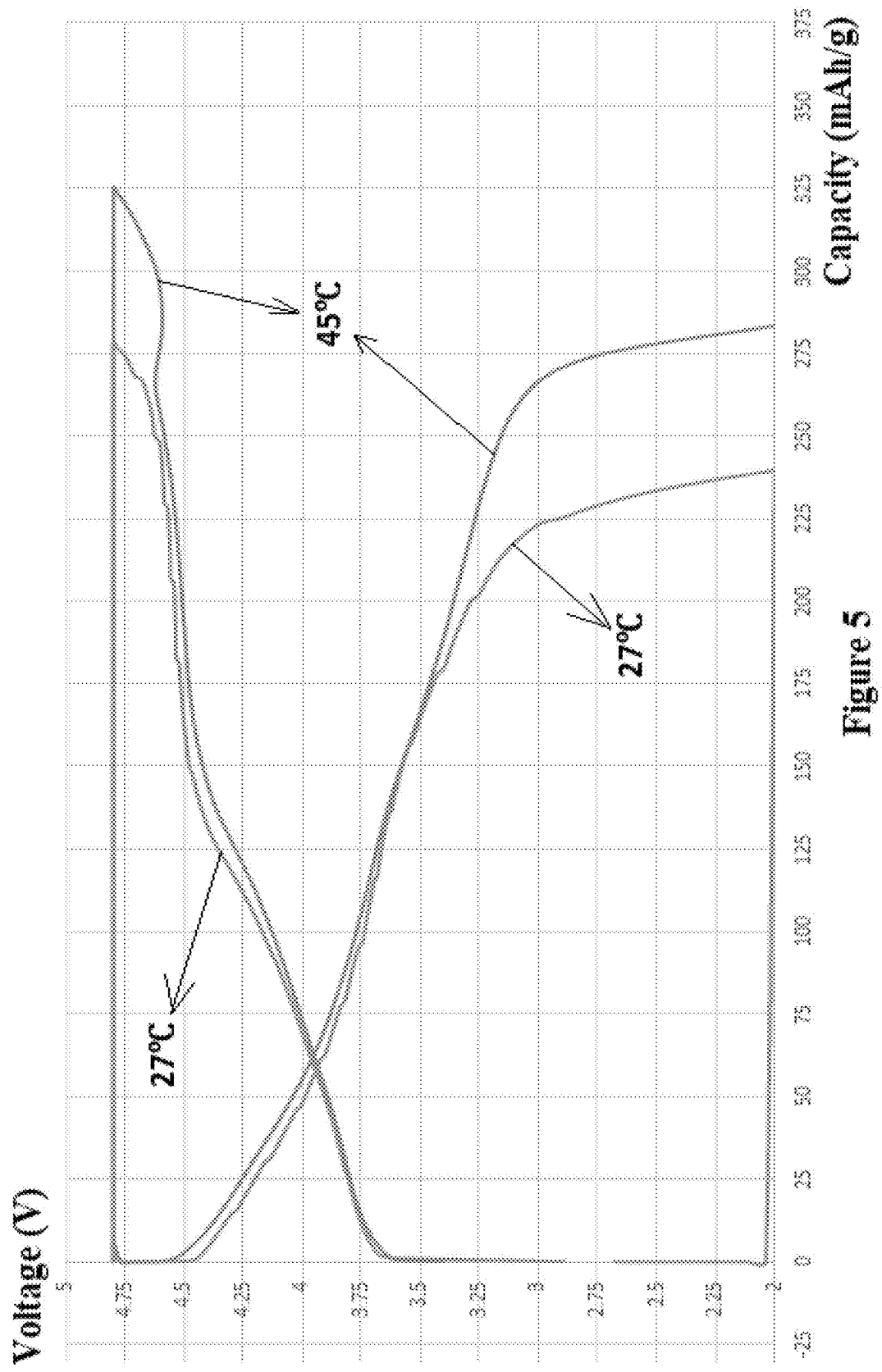
FIG. 5 depicts the first charge-discharge curves of a battery using an active composition of Formula (I), wherein x=0.4, y=0.034, a=0.715, b=0.285, a/b=2.5, D is Sn0.01O0.02, and C is Al0.039F0.12, in accordance with an exemplary embodiment of the present invention.

FIG. 5 demonstrates the first charge-discharge curves of sample "S7" at 0.1C Rate 2.0-4.8V and two different temperatures (27° C. and 45° C.). Sample "S7" is the active composition of Formula (I) from Example 7, wherein x=0.4, y=0.034, a=0.715, b=0.285, a/b=2.5, D is Sn0.01O0.02, and C is Al0.039F0.12, i.e. Li1.4Mn0.715Ni0.285O2.4.Li0.034Co0.034O0.068.Sn0.01O0.02*Al0.039F0.12.

Figure 6:
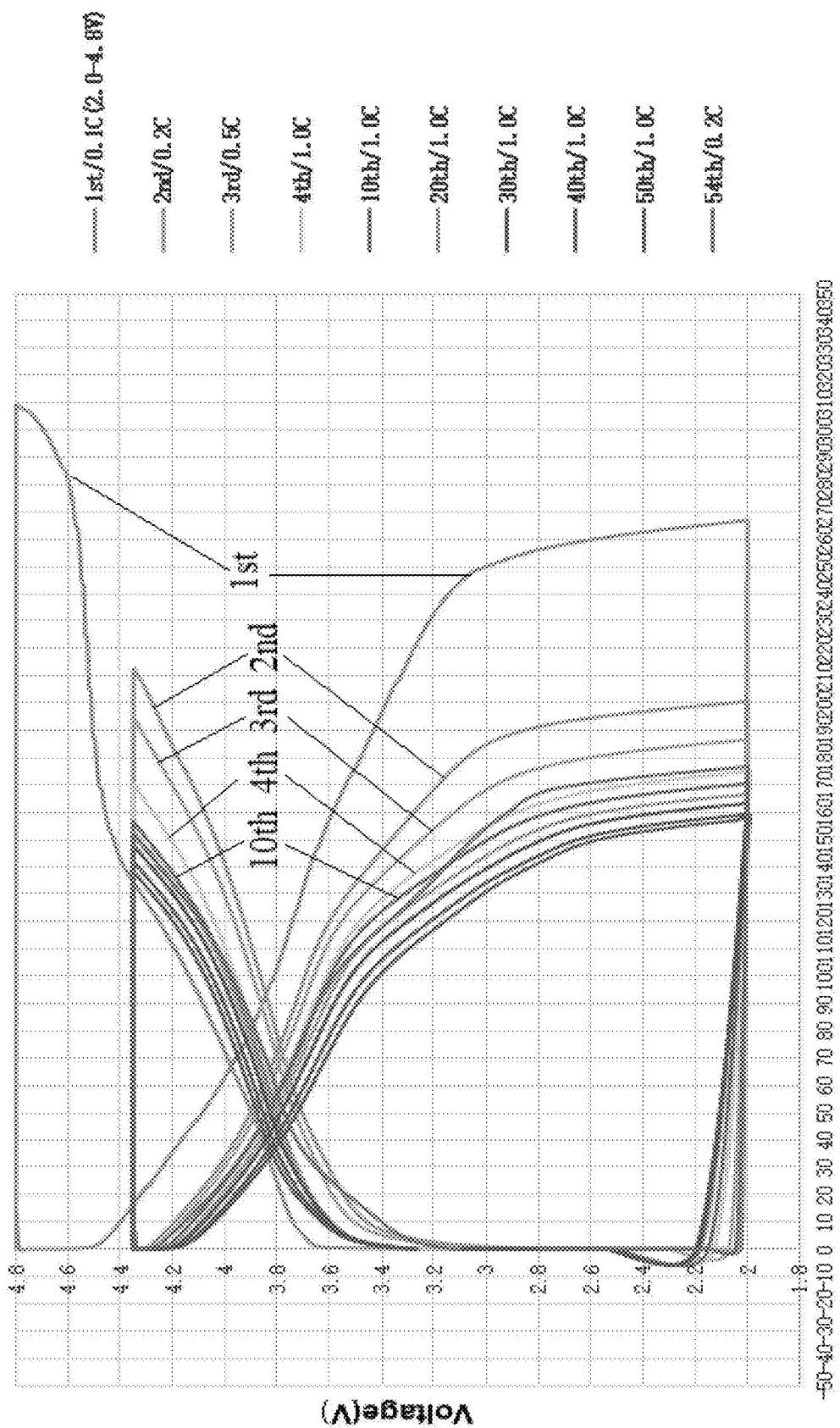
FIG. 6 shows the charge-discharge curves of a battery using an active composition of Formula (I) in cycle performance at different C Rate, 27° C. and 2.0-4.35V, wherein x=0.4, y=0.034, a=0.715 b=0.285, a/b=2.5, D is Sn0.01O0.02, and C is Li0.01V0.01O0.03, in accordance with an exemplary embodiment of the present invention.
Figure 7:
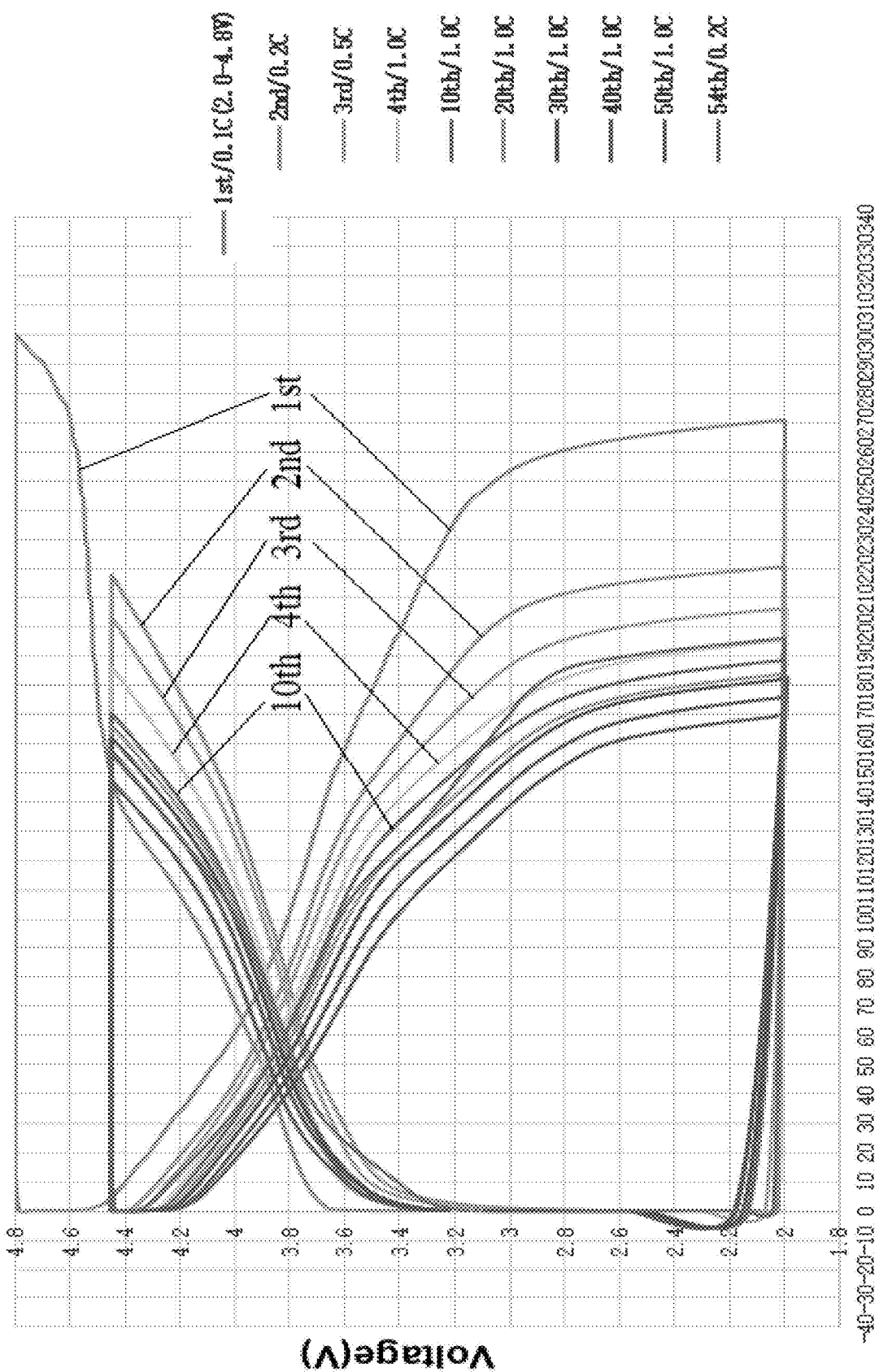
FIG. 7 shows the charge-discharge curves of a battery using an active composition of Formula (I) in cycle performance at different C Rate, 27° C. and 2.0-4.45V, wherein x=0.4, y=0.034, a=0.715, b=0.285, a/b=2.5, D is Sn0.01O0.02, and C is Li0.01V0.01O0.03, in accordance with an exemplary embodiment of the present invention.
Figure 8:
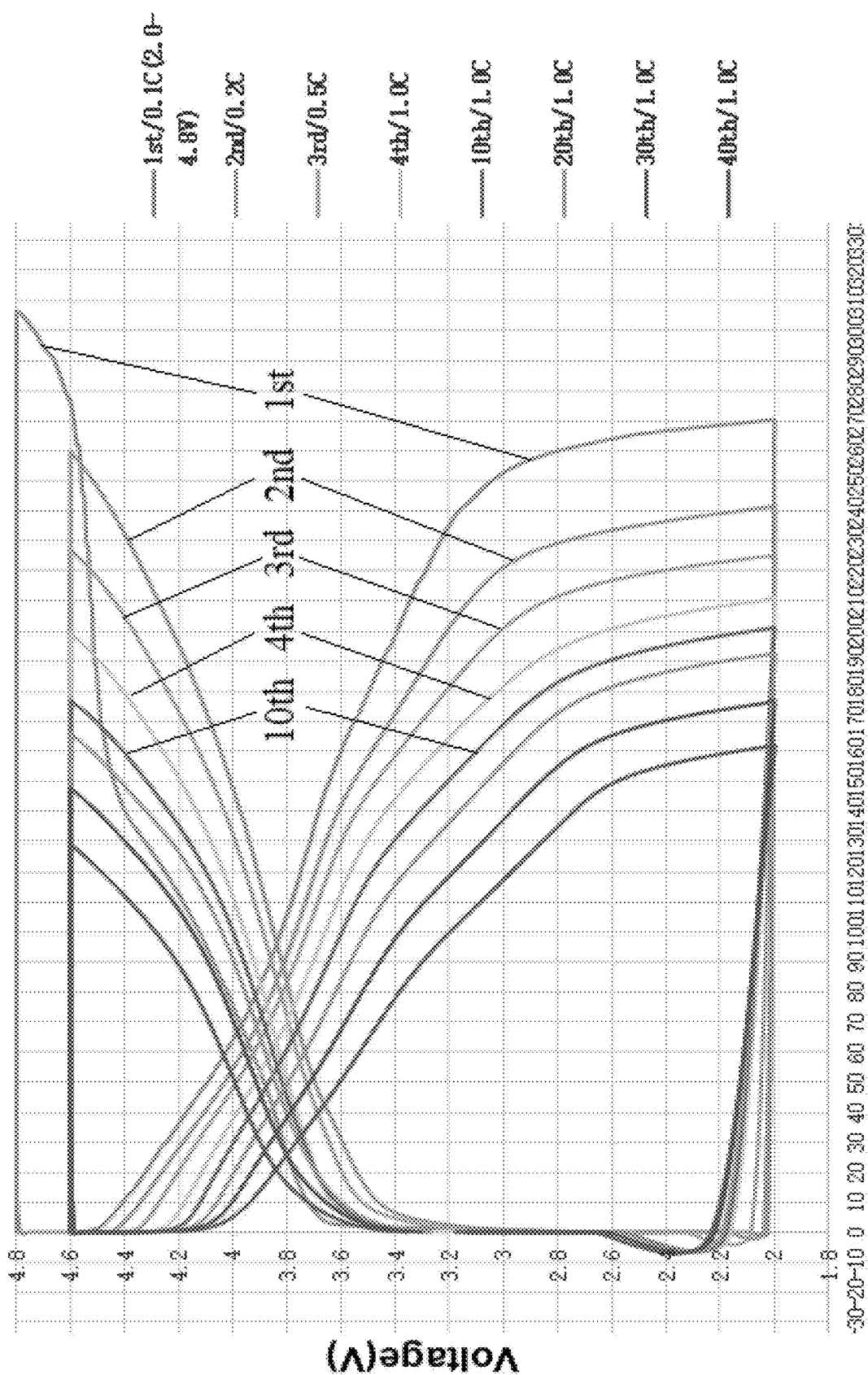
FIG. 8 shows the charge-discharge curves of a battery using an active composition of Formula (I) in cycle performance at different C Rate, 27° C. and 2.0-4.60V, wherein =0.4, y=0.034, a=0.715, b=0.285, a/b=2.5, D is Sn0.01O0.02, and C is Li0.01V0.01O0.03, in accordance with an exemplary embodiment of the present invention.
Figure 9:
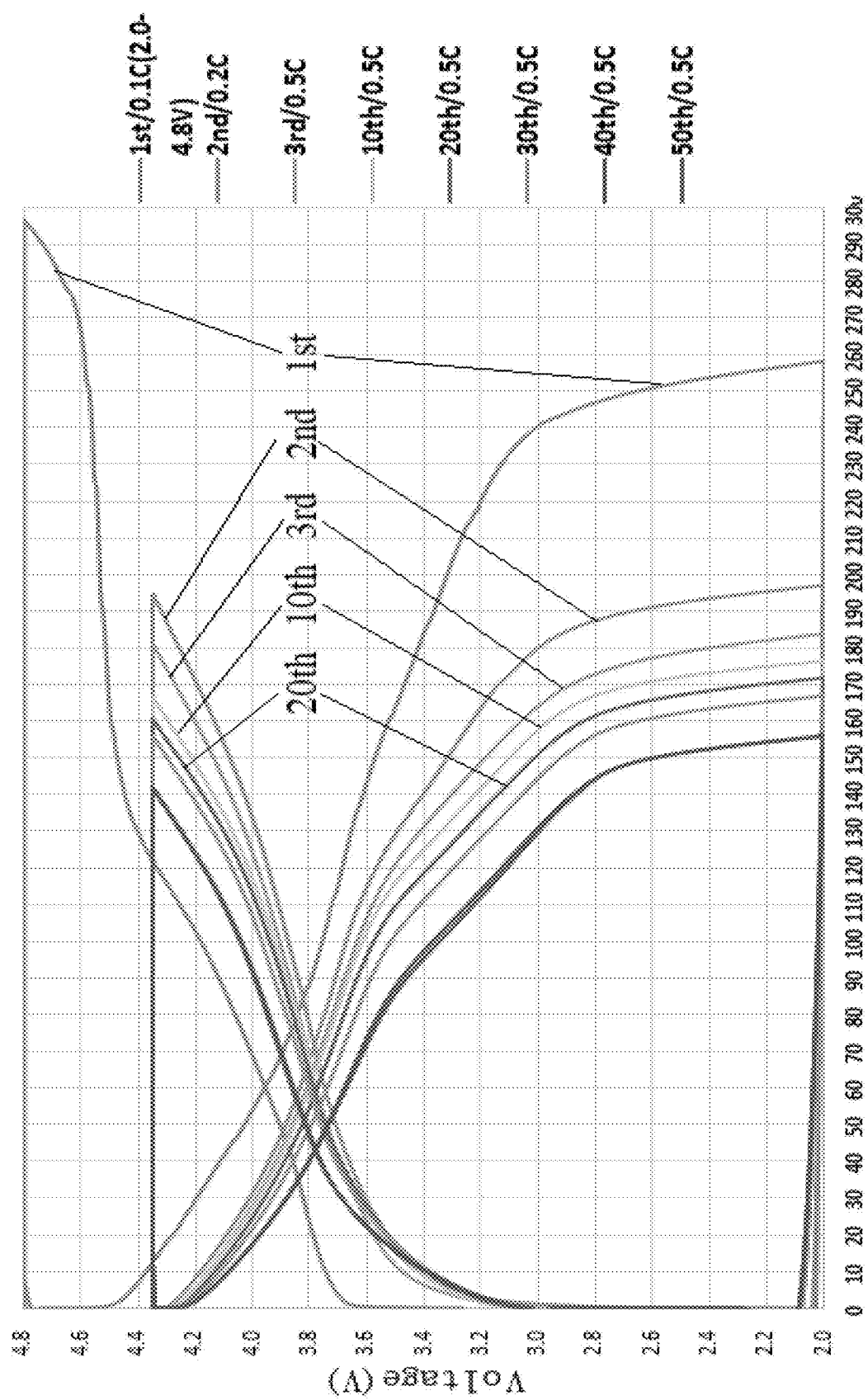
FIG. 9 shows the charge-discharge curves of a battery using an active composition of Formula (I) in cycle performance at different C Rate, 27° C. and 2.0-4.35V wherein =0.4, y=0.034, a=0.715, b=0.285, a/b=2.5, D is Sn0.01O0.02, and C is Li0.01V0.01O0.03, in accordance with an exemplary embodiment of the present invention.
Figure 10:
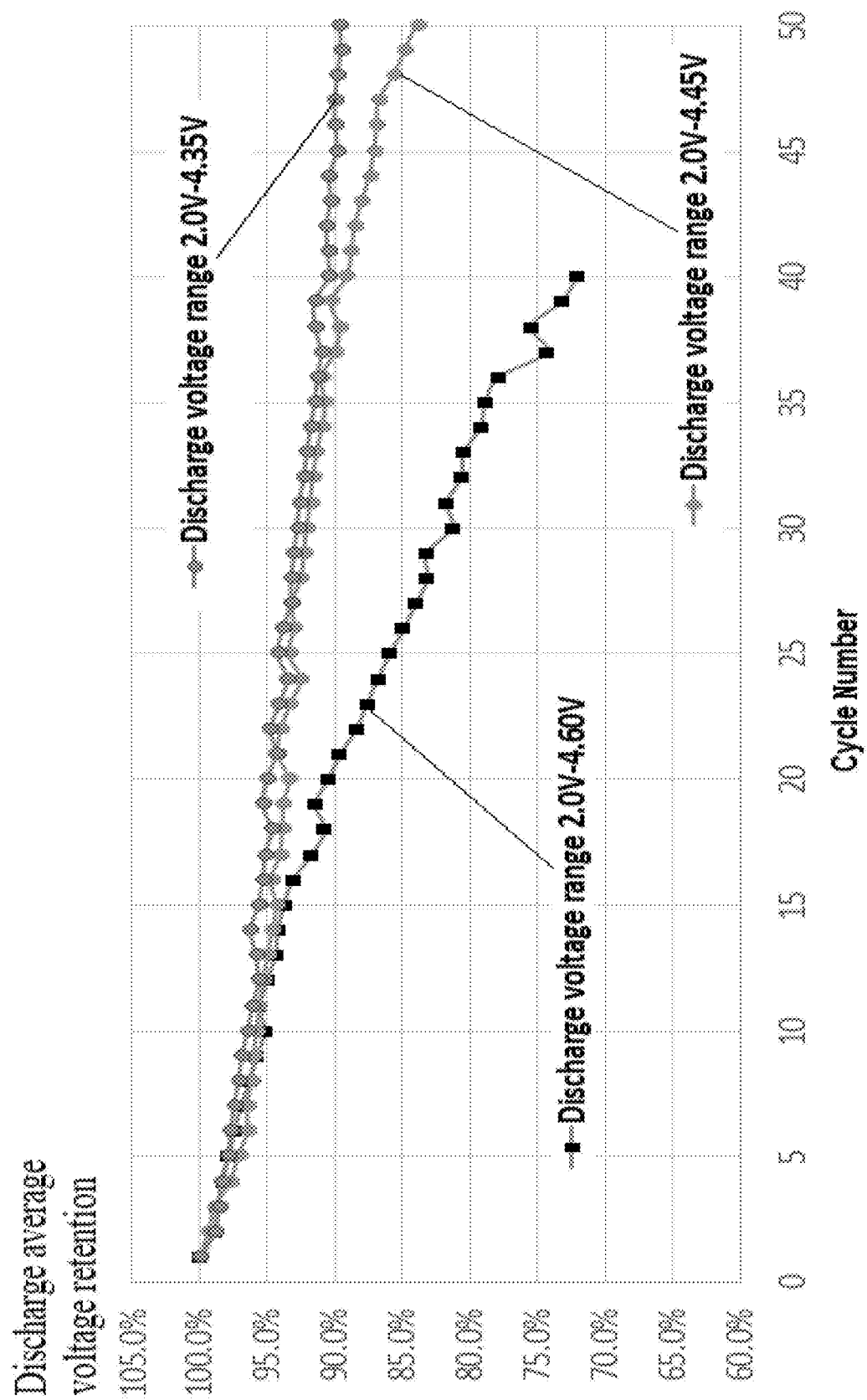
FIG. 10 shows the discharge average voltage retention performance of a battery using an active composition of Formula (I) at 10C Rate, 27° C. and different discharged voltage ranges, wherein =0.4, y=0.034, a=0.715, b=0.285, a/b=2.5, D is Sn0.01O0.02, and C is Li0.01V0.01O0.03, in accordance with an exemplary embodiment of the present invention.

FIG. 6 shows the charge-discharge curves of Sample "S8" in cycle performance at different C Rate, 27° C. and 2.0-4.35V, except that the first cycle is 2.0-4.8V. Sample "S8" is the active composition of Formula (I) from Example 8, wherein x=0.4, y=0.034, a=0.715, b=0.285, a/b=2.5, D is Sn0.01O0.02, and C is Li0.01V0.01O0.03; i.e. Li1.4Mn0.715Ni0.285O2.4.Li0.034Co0.034O0.068.Sn0.01 FIG. 7 shows the charge-discharge curves of Sample "S8" in cycle performance at different C Rate, 27° C. and 2.0-4.45V, except that the first cycle is 10-4.8V FIG. 8 shows the charge-discharge curves of Sample "S8" in cycle performance at different C Rate, 27° C. and 2.0-4.60V, except that the first cycle is 2.0-4.8V FIG. 9 shows the charge-discharge curves of Sample "S8" in cycle performance at different C Rate, 27° C. and 2.0-4.35V, except that the first cycle is 2.0-4.8V FIG. 10 shows the Discharge Capacity Cycle Performance of Sample "S8" at 1.0C Rate, 27° C. and different discharged voltage ranges.

Figure 11:
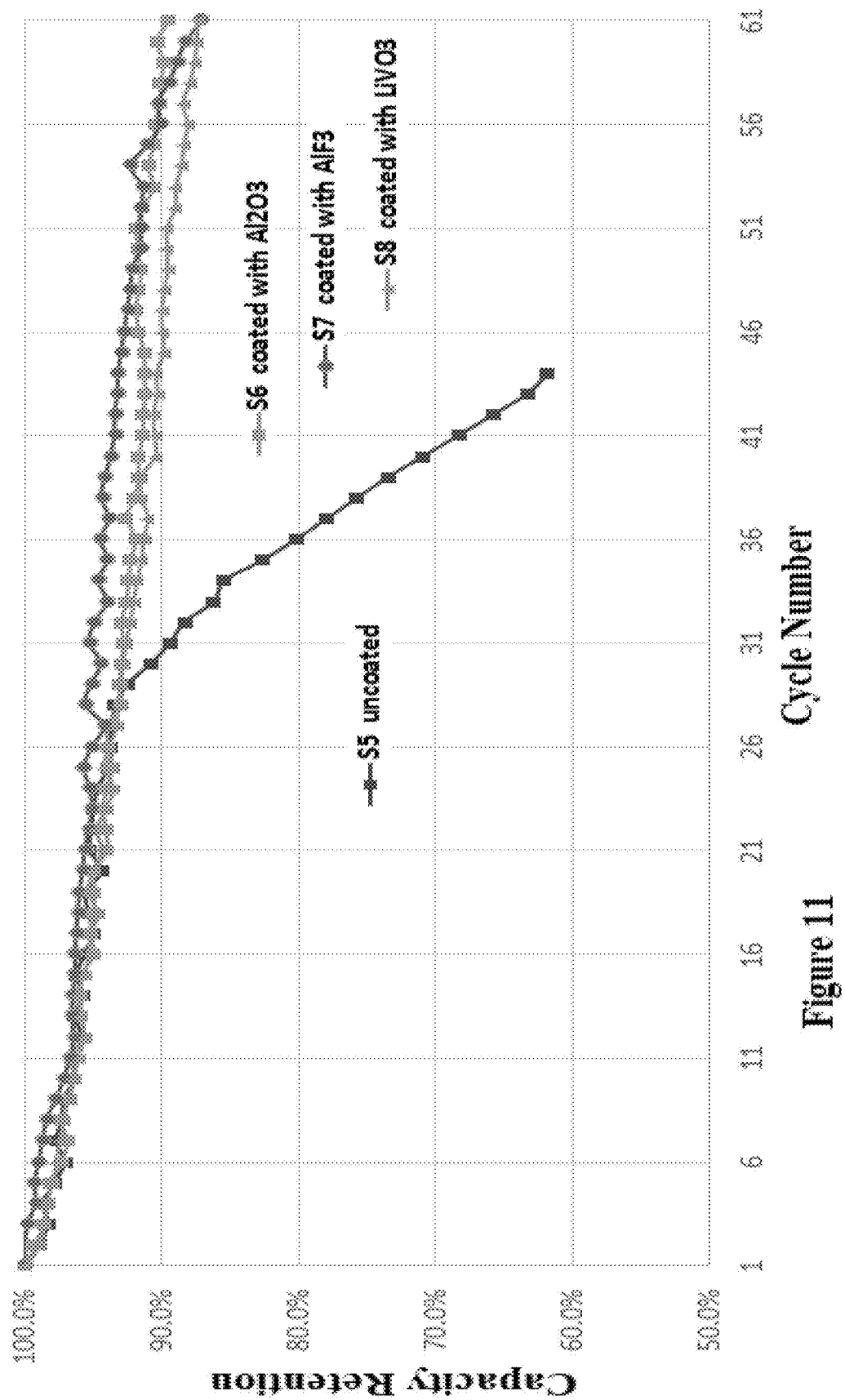
FIG. 11 compares the capacity retention of a battery using an active composition of Formula (I) wherein x=0.4, y=0.034, a=0.715, b=0.285, a/b=2.5, D is Sn0.01O0.02, and C is absent, as compared to that wherein C is Al0.039O0.058, Al0.039F0.12, or Li0.01V0.01O0.03, in accordance with an exemplary embodiment of the present invention.
Figure 12:
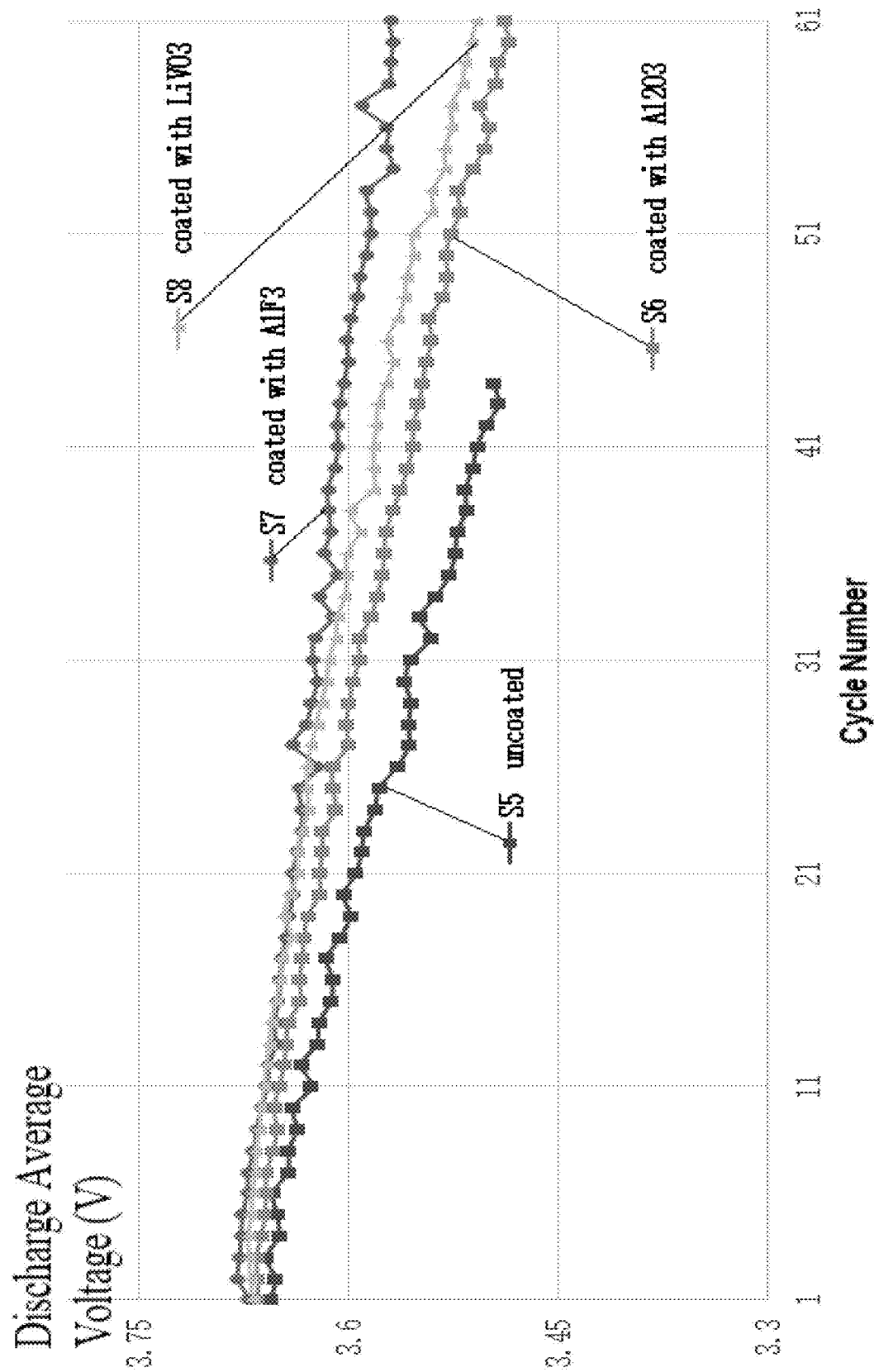
FIG. 12 compares the discharged average voltage of a battery using an active composition of Formula (I) wherein x=0.4, y=0.034, a=0.715, b=0.285, a/b=2.5, D is Sn0.01O0.02, and C is absent, as compared to that wherein C is Al0.039O0.058, Al0.039F0.12, or Li0.01V0.01O0.03, in accordance with an exemplary embodiment of the present invention.

FIG. 11 compares the discharge capacity retention of sample "S5" vs samples "S6", "S7" and "S8" in Capacity Cycle Performance at 1.0C Rate, 27° C. and 2.0-4.35V, Samples "S6", "S7" and "S8" were prepared from sample "S5" by coating "S5" 3 different Agents. Sample "S5" is the active composition of Formula (I) from Example 5, wherein x=0.4, y=0.034, a=0.715, b=0.285, a/b=2.5, D is Sn0.01O0.02, and C is absent, i.e. Li1.4Mn0.715Ni0.285O2.4.Li0.034Co0.034O0.068.Sn0.01 O0.02. Sample "S6" is the active composition of Formula (I) from Example 6, wherein x=0.4, y=0.034, a=0.715, b=0.285, a/b=2.5, D is Sn0.01O0.02, and C is Al0.039O0.058, i.e. Li1.4Mn0.715Ni0.285O2.4.Li0.034Co0.034O0.068.Sn0.01 O0.02*Al0.039O0.058. Sample "S7" is the active composition of Formula (I) from Example 7, wherein x=0.4, y=0.034, a=0.715, b=0.285, a/b=2.5, D is Sn0.01O0.02, and C is Al0.039F0.12, i.e. Li1.4Mn0.715Ni0.285O2.4.Li0.034Co0.034O0.068.Sn0.01 O0.02*Al0.039F0.12, Sample "S8" is the active composition of Formula (I) from Example 8, wherein x=0.4, y=0.034, a=0.715, b=0.285, a/b=2.5, D is Sn0.01O0.02, and C is Li0.01V0.01O0.03, i.e. Li1.4Mn0.715Ni0.285O2.4.Li0.034Co0.034O0.068.Sn0.01 O0.02*Li0.01V0.01O0.03. FIG. 12 compares the Discharged Average Voltage Cycle Performance of sample "S5" vs samples "S6", "S7" and "S8" at 1.0C Rate, 27° C. and 2.0-4.35V.

TABLE 3

| | First Charge-Discharge at 0.1 C and 2.0-4.8 V | | | | |
|---|---|---|---|---|---|
| Sample | Charge-Discharge Voltage Range | Charged mAh/g | Discharged mAh/g | Efficiency % | Min-Voltage V |
| CS1 | 2.0-4.8 V | 272.0 | 221.7 | 81.51% | 2.6040 |
| CS2 | 2.0-4.8 V | 278.5 | 228.9 | 82.19% | 3.6230 |
| S1 | 2.0-4.8 V | 293.2 | 235.9 | 80.46% | 3.6350 |
| S2 | 2.0-4.8 V | 300.4 | 239.1 | 79.59% | 3.6840 |
| S3 | 2.0-4.8 V | 293.3 | 234.9 | 80.11% | 3.7527 |
| S4 | 2.0-4.8 V | 309.7 | 249.3 | 80.52% | 3.7230 |
| S5 | 2.0-4.8 V | 290.1 | 238.9 | 82.36% | 3.6920 |
| S6 | 2.0-4.8 V | 290.8 | 243.4 | 83.69% | 3.7038 |
| S7 | 2.0-4.8 V | 284.0 | 239.5 | 84.33% | 3.6762 |
| S8 | 2.0-4.8 V | 313.2 | 266.9 | 85.23% | 3.6960 |
| NCM523 | 2.0-4.30 V | 180.7 | 165.7 | 91.70% | 3.7934 |

| | 2nd at 0.2 C | | |
|---|---|---|---|
| Sample | Charge-Discharge Voltage Range | Discharged mAh/g | Min-Voltage V |
| CS1 | 2.0-4.35 V | 165.9 | 3.6190 |
| CS2 | 2.0-4.35 V | 170.3 | 3.6510 |
| S1 | 2.0-4.35 V | 177.0 | 3.6470 |
| S2 | 2.0-4.35 V | 177.8 | 3.6950 |
| S3 | 2.0-4.30 V | 179.8 | 3.7437 |
| S4 | 2.0-4.30 V | 181.2 | 3.7044 |
| S5 | 2.0-4.35 V | 181.5 | 3.6935 |
| S6 | 2.0-4.35 V | 183.9 | 3.7056 |
| S7 | 2.0-4.35 V | 183.2 | 3.6985 |
| S8 | 2.0-4.35 V | 200.6 | 3.6920 |
| NCM523 | 2.0-4.30 V | 162.2 | 3.7918 |

| | 3rd at 0.5 C | | |
|---|---|---|---|
| Sample | Charge-Discharge Voltage Range | Discharged mAh/g | Min-Voltage V |
| CS1 | 2.0-4.35 V | 152.5 | 3.5750 |
| CS2 | 2.0-4.35 V | 157.7 | 3.6280 |
| S1 | 2.0-4.35 V | 163.6 | 3.6350 |
| S2 | 2.0-4.35 V | 162.6 | 3.6700 |
| S3 | 2.0-4.30 V | 165.9 | 3.7459 |
| S4 | 2.0-4.30 V | 163.5 | 3.7072 |
| S5 | 2.0-4.35 V | 168.7 | 3.6827 |
| S6 | 2.0-4.35 V | 169.7 | 3.6985 |
| S7 | 2.0-4.35 V | 172.5 | 3.6907 |
| S8 | 2.0-4.35 V | 186.6 | 3.6883 |
| NCM523 | 2.0-4.30 V | 157.5 | 3.7831 |

TABLE 3-continued

4th to 53rd at 0.1 C

| Sample | Charge-Discharge Voltage Range | 4th Discharged mAh/g | 4th min-Voltage V | 53rd Discharged mAh/g | 53rd min-Voltage V |
|---|---|---|---|---|---|
| CS1 | 2.0-4.35 V | 142.0 | 3.4000 | n/a | n/a |
| CS2 | 2.0-4.35 V | 146.8 | 3.5800 | n/a | n/a |
| S1 | 2.0-4.35 V | 150.5 | 3.6090 | n/a | n/a |
| S2 | 2.0-4.35 V | 149.0 | 3.6060 | n/a | n/a |
| S3 | 2.0-4.30 V | 156.5 | 3.7239 | 149.3 | 3.6086 |
| S4 | 2.0-4.30 V | 152.4 | 3.6790 | 137.8 | 3.6080 |
| S5 | 2.0-4.35 V | 158.5 | 3.6554 | n/a | n/a |
| S6 | 2.0-4.35 V | 159.1 | 3.6644 | 146.0 | 3.5301 |
| S7 | 2.0-4.35 V | 161.9 | 3.6706 | 148.4 | 3.5875 |
| S8 | 2.0-4.35 V | 174.8 | 3.6678 | 156.7 | 3.5531 |
| NCM523 | 2.0-4.30 V | 156.7 | 3.7825 | 142.5 | 3.7062 |

54th at 0.2 C

| Sample | Charge-Discharge Voltage Range | 54th Discharged mAh/g | 54th min-Voltage V |
|---|---|---|---|
| CS1 | 2.0-4.35 V | n/a | n/a |
| CS2 | 2.0-4.35 V | n/a | n/a |
| S1 | 2.0-4.35 V | n/a | n/a |
| S2 | 2.0-4.35 V | n/a | n/a |
| S3 | 2.0-4.30 V | 169.0 | 3.6808 |
| S4 | 2.0-4.30 V | 160.0 | 3.6641 |
| S5 | 2.0-4.35 V | n/a | n/a |
| S6 | 2.0-4.35 V | 166.3 | 3.6458 |
| S7 | 2.0-4.35 V | 167.2 | 3.6777 |
| S8 | 2.0-4.35 V | 176.7 | 3.6492 |
| NCM523 | 2.0-4.30 V | n/a | n/a |

Figure 13:
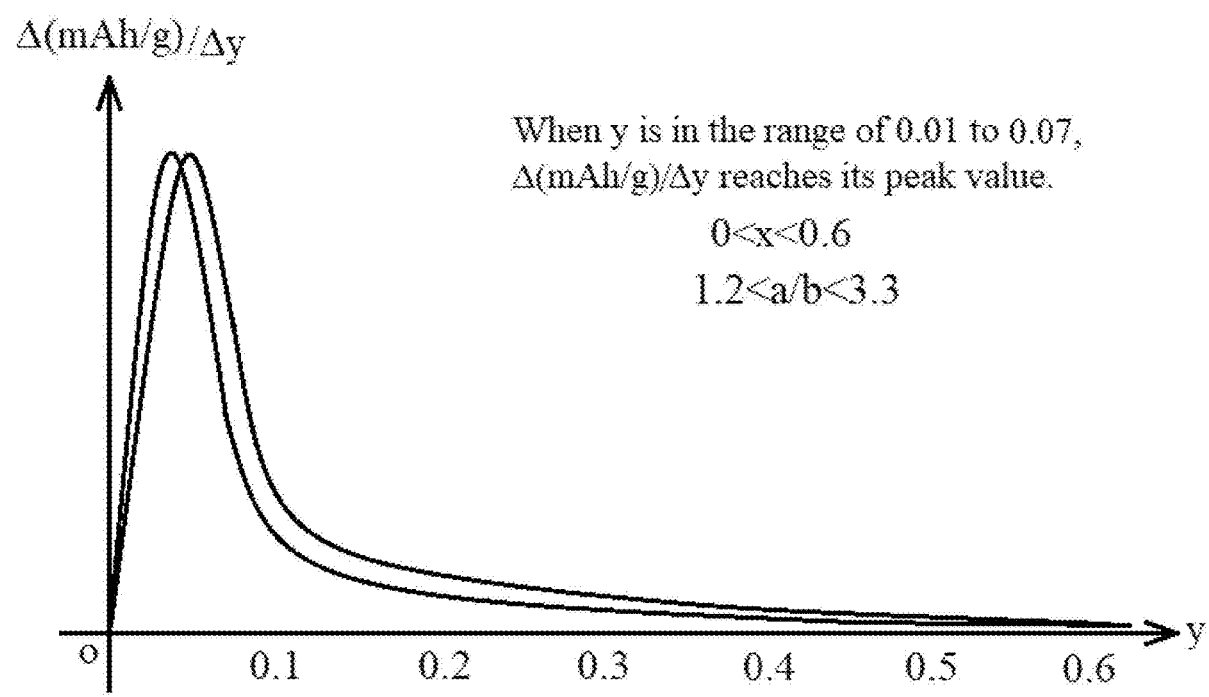
FIG. 13 illustrates the marginal improvement of Specific Capacity Δ(mAh/g) of a battery using an active composition of formula (I), when y is increased by an arbitrary unit (e.g. 0.01), in accordance with an exemplary embodiment of the present invention.

Electrode active compositions of formula (I) selected from Examples 1-61 exhibit a wide range of specific discharge capacity (e.g. at least about 215-280 mAh/g) at a discharge rate of C/10 when discharged from 4.8V to 2.0V For example, the specific capacities (mAh/g) of the electrode active compositions from Examples 1-8 are 235.9, 239.1, 234.9, 249.3, 238.9, 243.4, 239.5, and 266.9, respectively. In contrast, the specific capacities (mAh/g) of the electrode active compositions from Comparative Examples 1-3 are 221.7, 228.9, and 165.7, respectively. If $\Delta(mAh/g)/\Delta y$ is defined as the improvement of the Specific Capacity $\Delta(mAh/g)$ of an active composition of formula (I) when y is increased by an arbitrary unit (e.g. 0.01), then it is estimated that the relationship between $\Delta(mAh/g)/\Delta y$ and y can be schematically illustrated in FIG. 13, in which $\Delta(mAh/g)$ reaches a significantly higher (at least 20% higher) value when y is between 0.01 and 0.1. The value $\Delta(mAh/g)$ reaches its peak value when y is between 0.01 and 0.05.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the set of claims that issue from this application, in the specific form in which such claims issue, including any subsequent correction.

The invention claimed is:

1. An electrode active composition represented by formula (I)

$$Li_{1+x}Mn_aNi_bO_{2+x} \cdot Li_yCo_yO_{2y}D*C \quad (I)$$

wherein x>0, 0<y<0.1, a+b=1, and 1.2≤a/b≤3.3;
wherein D is one or more dopants that contain(s) no Cobalt (Co) element, and D may be present or absent (i.e. optional) in formula (I); and
wherein C is one or more coating agents that contain(s) no Cobalt element, and C may be present or absent (i.e. optional) in formula (I).

2. The electrode active composition according to claim 1, wherein $Y_L \le y < Y_H$, and wherein $Y_L$ and $Y_H$ are selected from 0.001, 0.002, 0.003, 0.004, 0.005, 0.006, 0.007, 0.008, 0.009, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.035, 0.04, 0.045, 0.05, 0.055, 0.06, 0.065, 0.07, 0.071, 0.072, 0.073, 0.074, 0.075, 0.076, 0.077, 0.078, 0.079, 0.08, 0.081, 0.082, 0.083, 0.084, 0.085, 0.086, 0.087, 0.088, 0.089, 0.09, 0.091, 0.092, 0.093, 0.094, 0.095, 0.096, 0.097, 0.098, and 0.099, providing that $Y_L \le Y_H$.

3. The electrode active composition according to claim 1, wherein 0.01≤y≤0.07.

4. The electrode active composition according to claim 1, wherein $Y_L \le y \le Y_H$, and wherein $Y_L$ and $Y_H$ are selected from 0.01, 0.015, 0.02, 0.025, 0.03, 0.035, 0.04, 0.045, 0.05, 0.055, 0.06, 0.065, and 0.07, providing that $Y_L \le Y_H$.

5. The electrode active composition according to claim 1, wherein $Y_L \leq y \leq Y_H$, and wherein $Y_L$ and $Y_H$ are selected from 0.023, 0.03, 0.034, 0.045, and 0.046, providing that $Y_L \leq Y_H$.

6. The electrode active composition according to claim 1, wherein y is 0.023, 0.03, 0.034, 0.045, or 0.046.

7. The electrode active composition according to claim 1, wherein $X_L \leq x \leq X_H$, and wherein $X_L$ and $X_H$ are selected from 0.1, 0.15, 0.2, 0.28, 0.3, 0.35, 0.375, 0.4, 0.43, 0.45, 0.5, 0.55, and 0.6, providing that $X_L \leq X_H$.

8. The electrode active composition according to claim 1, wherein $X_L \leq x \leq X_H$, and wherein $X_L$ and $X_H$ are selected from 0.28, 0.375, 0.4, and 0.43, providing that $X_L \leq X_H$.

9. The electrode active composition according to claim 1, wherein $(a/b)_L \leq a/b \leq (a/b)_H$, and wherein $(a/b)_L$ and $(a/b)_H$ are selected from 1.2, 1.3, 1.4, 1.5, 1.6, 1.7, 1.8, 1.9, 2.05, 2.1, 2.2, 2.3, 2.4, 2.5, 2.6, 2.7, 2.8, 2.9, 3.0, 3.1, 3.2, and 3.3, providing that $(a/b)_L \leq (a/b)_H$.

10. The electrode active composition according to claim 1, wherein $(a/b)_L \leq a/b \leq (a/b)_H$, and wherein $(a/b)_L$ and $(a/b)_H$ are selected from 1.7, 2.05, 2.2, and 2.5, providing that $(a/b)_L \leq (a/b)_H$.

11. The electrode active composition according to claim 1, wherein D and C are independently of each other selected from $M_{(0-0.1)}$ oxides, $M_{(0-0.1)}$ fluorides, salts of $M_{(0-0.1)}$ with the conjugate base of an inorganic acid, or any combination thereof, wherein M is selected from Li, Mg, Sr, Ba, Cd, Zn, Al, Ga, B, Zr, Ti, Ca, Ce, Y, Nb, Cr, Fe, Mo, W, and V.

12. The electrode active composition according to claim 1, wherein D and C are independently of each other selected, by stoichiometry, from the group consisting of $Al_2O_3$, MgO, $Cr_2O_3$, $SnO_2$, $SrO_2$, ZnO, $Nb_2O_5$, $ZrO_2$, $TiO_2$, FeO, $Fe_3O_4$, $AlF_3$, $BF_3$, $FeF_3$, $CaF_2$, $MgF_2$, $B_2O_3$, $B_2O_5$, LiF, $SrF_2$, $SnF_2$, $ZnF_2$, $CuF_2$, $MnF_2$, $NiF_2$, $LiB_3O_5$, $Li_3BO_3$, $LiBO_2$, $Li_3B_7O_{12}$, $LiAlO_2$, $Li_2SiO_3$, $Li_8SiO_6$, $LiPO_3$, $Li_3PO_4$, $LiTi_2(PO_4)_3$, $Li_4Ti_5O_{12}$, $LiNbO_3$, $Li_3NbO_4$, $Li_2ZrO_3$, $Li_3TaO_3$, $LiCr_3O_8$, $LiVO_3$, $Li_2MoO_4$, $Li_2Mo_2O_7$, $Li_2TiO_3$, $Li_2WO_4$, $LiTa_3O_8$, $Li_4GeO_4$, $LiFePO_4$, and $Fe_2P_2O_7$.

13. The electrode active composition according to claim 1, wherein D is selected from the group consisting of $Li_{0.045}Ti_{0.021}O_{0.063}$, $Sn_{0.01}O_{0.02}$, $Li_{0.03}V_{0.03}O_{0.09}$, and $Li_{0.1}Mo_{0.05}O_{0.2}$.

14. The electrode active composition according to claim 1, wherein C is selected from the group consisting of $Al_{0.039}F_{0.12}$, $Al_{0.0039}O_{0.058}$, $Al_{0.03}F_{0.09}$, $Al_{0.05}F_{0.15}$, $Ca_{0.03}F_{0.06}$, $Ca_{0.05}F_{0.1}$, $Li_{0.01}V_{0.01}O_{0.03}$, $Li_{0.03}(PO_4)_{0.01}$, $Li_{0.03}Al_{0.03}O_{0.06}$, $Li_{0.03}Mo_{0.03}O_{0.12}$, $Li_{0.03}Nb_{0.03}O_{0.09}$, $Li_{0.03}V_{0.03}O_{0.09}$, $Li_{0.06}W_{0.03}O_{0.12}$, $Li_{0.05}Al_{0.05}O_{0.1}$, $Li_{0.05}Nb_{0.05}O_{0.10}$, $Li_{0.05}B_{0.05}O_{0.15}$, $Li_{0.05}W_{0.05}O_{0.2}$, $Li_{0.03}(PO_4)_{0.02}$, $Li_{0.06}W_{0.03}O_{0.12}$, $Li_{0.08}W_{0.04}O_{0.16}$, $Li_{0.09}B_{0.03}O_{0.09}$, $Li_{0.15}(PO_4)_{0.05}$, $Li_{0.15}B_{0.05}O_{0.1}$, $Li_{0.15}B_{0.05}O_{0.15}$, $Li_{0.1}Mo_{0.05}O_{0.2}$, $Mg_{0.03}F_{0.06}$, $Mg_{0.05}F_{00.1}$, $Zn_{0.05}O_{0.05}$, $Zn_{0.07}O_{0.07}$, $Zr_{0.03}O_{0.06}$, and $Zn_{0.05}O_{0.1}$.

15. The electrode active composition according to claim 1, wherein D*C is selected from the group consisting of:

$Li_{0.045}Ti_{0.021}O_{0.063}*Al_{0.039}O_{0.058}$,
$Li_{0.045}Ti_{0.021}O_{0.063}*Al_{0.039}F_{0.12}$,
$Sn_{0.01}O_{0.02}*Al_{0.039}O_{0.058}$,
$Sn_{0.01}O_{0.02}*Al_{0.039}F_{0.12}$,
$Sn_{0.01}O_{0.02}*Li_{0.01}V_{0.01}O_{0.03}$,
$Li_{0.03}V_{0.03}O_{0.09}*Zn_{0.07}O_{0.07}$,
$Li_{0.03}V_{0.03}O_{0.09}*Li_{0.05}Al_{0.05}O_{0.1}$,
$Li_{0.03}V_{0.03}O_{0.09}*Al_{0.05}F_{0.15}$,
$Li_{0.03}V_{0.03}O_{0.09}*Ca_{0.05}F_{0.1}$,
$Li_{0.1}Mo_{0.05}O_{0.2}*Ca_{0.03}F_{0.06}$,
$Li_{0.1}Mo_{0.05}O_{0.2}*Li_{0.03}(PO_4)_{0.01}$,
$Li_{0.1}Mo_{0.05}O_{0.2}*Li_{0.03}V_{0.03}O_{0.09}$,
$Li_{0.1}Mo_{0.05}O_{0.2}*Al_{0.03}F_{0.09}$,
$Li_{0.1}Mo_{0.05}O_{0.2}*Zn_{0.05}O_{0.05}$, and
$Li_{0.1}Mo_{0.05}O_{0.2}*Li_{0.03}Al_{0.03}O_{0.06}$.

16. The electrode active composition according to claim 1, which is selected from the group consisting of:

$Li_{1.43}Mn_{0.715}Ni_{0.285}O_{2.43} \cdot Li_{0.046}Co_{0.046}O_{0.092}$,
$Li_{1.43}Mn_{0.715}Ni_{0.285}O_{2.43} \cdot Li_{0.046}Co_{0.046}O_{0.092} \cdot Li_{0.045}Ti_{0.021}O_{0.063}$,
$Li_{1.43}Mn_{0.715}Ni_{0.285}O_{2.43} \cdot Li_{0.046}Co_{0.046}O_{0.092} \cdot Li_{0.045}Ti_{0.021}O_{0.063}*Al_{0.039}O_{0.058}$,
$Li_{1.43}Mn_{0.715}Ni_{0.285}O_{2.43} \cdot Li_{0.046}Co_{0.046}O_{0.092} \cdot Li_{0.045}Ti_{0.021}O_{0.063}*Al_{0.039}F_{0.12}$,
$Li_{1.4}Mn_{0.715}Ni_{0.285}O_{2.4} \cdot Li_{0.034}Co_{0.034}O_{0.068} \cdot Sn_{0.01}O_{0.02}$,
$Li_{1.4}Mn_{0.715}Ni_{0.285}O_{2.4} \cdot Li_{0.034}Co_{0.034}O_{0.068} \cdot Sn_{0.01}O_{0.02}*Al_{0.039}O_{0.058}$,
$Li_{1.4}Mn_{0.715}Ni_{0.285}O_{2.4} \cdot Li_{0.034}Co_{0.034}O_{0.068} \cdot Sn_{0.01}O_{0.02}*Al_{0.039}F_{0.12}$,
$Li_{1.4}Mn_{0.715}Ni_{0.285}O_{2.4} \cdot Li_{0.034}Co_{0.034}O_{0.068} \cdot Sn_{0.01}O_{0.02}*Li_{0.01}V_{0.01}O_{0.03}$,
$Li_{1.40}Mn_{0.688}Ni_{0.312}O_{2.40} \cdot Li_{0.045}Co_{0.045}O_{0.09} \cdot Li_{0.03}V_{0.03}O_{0.09}$,
$Li_{1.40}Mn_{0.688}Ni_{0.312}O_{2.40} \cdot Li_{0.045}Co_{0.045}O_{0.09} \cdot Li_{0.03}V_{0.03}O_{0.09}*Zn_{0.07}O_{0.07}$,
$Li_{1.40}Mn_{0.688}Ni_{0.312}O_{2.40} \cdot Li_{0.045}Co_{0.045}O_{0.09} \cdot Li_{0.03}V_{0.03}O_{0.09}*Li_{0.05}Al_{0.05}O_{0.1}$,
$Li_{1.40}Mn_{0.688}Ni_{0.312}O_{2.40} \cdot Li_{0.03}Co_{0.03}O_{0.06} \cdot Li_{0.03}V_{0.03}O_{0.09}*Al_{0.05}F_{0.15}$,
$Li_{1.40}Mn_{0.688}Ni_{0.312}O_{2.40} \cdot Li_{0.03}Co_{0.03}O_{0.06} \cdot Li_{0.03}V_{0.03}O_{0.09}*Ca_{0.05}F_{0.1}$,
$Li_{1.375}Mn_{0.688}Ni_{0.312}O_{2.375} \cdot Li_{0.03}Co_{0.03}O_{0.06}*Ca_{0.05}F_{0.1}$,
$Li_{1.375}Mn_{0.688}Ni_{0.312}O_{2.375} \cdot Li_{0.03}Co_{0.03}O_{0.06}*Li_{0.06}(PO_4)_{0.02}$,
$Li_{1.375}Mn_{0.688}Ni_{0.312}O_{2.375} \cdot Li_{0.03}Co_{0.03}O_{0.06}*Li_{0.05}V_{0.05}O_{0.15}$,
$Li_{1.375}Mn_{0.688}Ni_{0.312}O_{2.375} \cdot Li_{0.03}Co_{0.03}O_{0.06}*Al_{0.05}F_{0.15}$,
$Li_{1.375}Mn_{0.688}Ni_{0.312}O_{2.375} \cdot Li_{0.03}Co_{0.03}O_{0.06}*Zn_{0.05}O_{0.05}$,
$Li_{1.375}Mn_{0.688}Ni_{0.312}O_{2.375} \cdot Li_{0.03}Co_{0.03}O_{0.06}*Li_{0.05}Al_{0.05}O_{0.1}$,
$Li_{1.375}Mn_{0.688}Ni_{0.312}O_{2.375} \cdot Li_{0.03}Co_{0.03}O_{0.06}*Li_{0.15}B_{0.05}O_{0.1}$,
$Li_{1.375}Mn_{0.688}Ni_{0.312}O_{2.375} \cdot Li_{0.03}Co_{0.03}O_{0.06}*Li_{0.05}Nb_{0.05}O_{0.15}$,
$Li_{1.375}Mn_{0.688}Ni_{0.312}O_{2.375} \cdot Li_{0.03}Co_{0.03}O_{0.06}*Li_{0.1}Mo_{0.05}O_{0.2}$,
$Li_{1.375}Mn_{0.688}Ni_{0.312}O_{2.375} \cdot Li_{0.03}Co_{0.03}O_{0.06}*Zr_{0.05}O_{0.1}$,
$Li_{1.375}Mn_{0.688}Ni_{0.312}O_{2.375} \cdot Li_{0.03}Co_{0.03}O_{0.06}*Li_{0.05}W_{0.05}O_{0.2}$,
$Li_{1.375}Mn_{0.63}Ni_{0.372}O_{2.375} \cdot Li_{0.03}Co_{0.03}O_{0.06}*Li_{0.1}Mo_{0.05}O_{0.2}*Ca_{0.03}F_{0.06}$,
$Li_{1.375}Mn_{0.63}Ni_{0.312}O_{2.375} \cdot Li_{0.03}Co_{0.03}O_{0.06}*Li_{0.1}Mo_{0.05}O_{0.2}*Li_{0.03}(PO_4)_{0.01}$,
$Li_{1.375}Mn_{0.63}Ni_{0.37}O_{2.375} \cdot Li_{0.03}Co_{0.03}O_{0.06}*Li_{0.1}Mo_{0.05}O_{0.2}*Li_{0.03}V_{0.03}O_{0.09}$,
$Li_{1.375}Mn_{0.63}Ni_{0.37}O_{2.375} \cdot Li_{0.03}Co_{0.03}O_{0.06}*Li_{0.1}Mo_{0.05}O_{0.2}*Zn_{0.05}O_{0.05}$,
$Li_{1.375}Mn_{0.63}Ni_{0.37}O_{2.375} \cdot Li_{0.03}Co_{0.03}O_{0.06}*Li_{0.1}Mo_{0.05}O_{0.2}*Li_{0.03}Al_{0.03}O_{0.06}$,
$Li_{1.375}Mn_{0.63}Ni_{0.37}O_{2.375} \cdot Li_{0.023}Co_{0.023}O_{0.046}*Mg_{0.05}F_{0.1}$,
$Li_{1.375}Mn_{0.63}Ni_{0.37}O_{2.375} \cdot Li_{0.023}Co_{0.023}O_{0.046}*Li_{0.15}B_{0.05}O_{0.15}$,
$Li_{1.375}Mn_{0.63}Ni_{0.37}O_{2.375} \cdot Li_{0.023}Co_{0.023}O_{0.046}*Li_{0.05}Nb_{0.05}O_{0.10}$,
$Li_{1.375}Mn_{0.63}Ni_{0.37}O_{2.375} \cdot Li_{0.023}Co_{0.023}O_{0.046}*Li_{0.1}Mo_{0.05}O_{0.20}$, $Li_{1.375}Mn_{0.63}Ni_{0.37}O_{2.375}.Li_{0.023}Co_{0.023}O_{0.046}*Zr_{0.03}O_{0.06}$, $Li_{1.375}Mn_{0.63}Ni_{0.37}O_{2.375}.Li_{0.023}Co_{0.023}O_{0.046}*Li_{0.08}W_{0.04}O_{0.16}$, $Li_{1.375}Mn_{0.672}Ni_{0.328}O_{2.375}.Li_{0.03}Co_{0.03}O_{0.06}*Ca_{0.05}F_{0.10}$, $Li_{1.375}Mn_{0.672}Ni_{0.328}O_{2.375}.Li_{0.03}Co_{0.03}O_{0.06}*Li_{0.15}(PO_4)_{0.15}$, $Li_{1.375}Mn_{0.672}Ni_{0.328}O_{2.375}.Li_{0.03}Co_{0.03}O_{0.06}*Li_{0.05}V_{0.05}O_{0.15}$, $Li_{1.375}Mn_{0.672}Ni_{0.328}O_{2.375}.Li_{0.03}Co_{0.03}O_{0.06}*Al_{0.03}F_{0.09}$, $Li_{1.375}Mn_{0.672}Ni_{0.328}O_{2.375}.Li_{0.03}Co_{0.03}O_{0.06}*Zn_{0.05}O_{0.05}$, $Li_{1.375}Mn_{0.672}Ni_{0.328}O_{2.375}.Li_{0.03}Co_{0.03}O_{0.06}*Li_{0.03}Al_{0.03}O_{0.06}$, $Li_{1.375}Mn_{0.672}Ni_{0.328}O_{2.375}.Li_{0.03}Co_{0.03}O_{0.06}*Mg_{0.03}F_{0.06}$, $Li_{1.375}Mn_{0.672}Ni_{0.328}O_{2.375}.Li_{0.03}Co_{0.03}O_{0.06}*Li_{0.09}B_{0.03}O_{0.09}$, $Li_{1.375}Mn_{0.672}Ni_{0.328}O_{2.375}.Li_{0.03}Co_{0.03}O_{0.06}*Li_{0.03}Nb_{0.03}O_{0.12}$, $Li_{1.375}Mn_{0.672}Ni_{0.328}O_{2.375}.Li_{0.03}Co_{0.03}O_{0.06}*Zr_{0.03}O_{0.06}$, $Li_{1.375}Mn_{0.672}Ni_{0.328}O_{2.375}.Li_{0.03}Co_{0.03}O_{0.06}*Li_{0.06}W_{0.03}O_{0.12}$, $Li_{1.28}Mn_{0.63}Ni_{0.37}O_{2.28}.Li_{0.03}Co_{0.03}O_{0.06}*Ca_{0.03}F_{0.06}$, $Li_{1.28}Mn_{0.63}Ni_{0.37}O_{2.28}.Li_{0.03}Co_{0.03}O_{0.06}*Li_{0.03}(PO_4)_{0.01}$, $Li_{1.28}Mn_{0.63}Ni_{0.37}O_{2.28}.Li_{0.03}Co_{0.03}O_{0.06}*Li_{0.03}V_{0.03}O_{0.09}$, $Li_{1.28}Mn_{0.63}Ni_{0.37}O_{2.28}.Li_{0.03}Co_{0.03}O_{0.06}*Al_{0.03}F_{0.09}$, $Li_{1.28}Mn_{0.63}Ni_{0.37}O_{2.28}.Li_{0.03}Co_{0.03}O_{0.06}*Zn_{0.05}O_{0.05}$, $Li_{1.28}Mn_{0.63}Ni_{0.37}O_{2.28}.Li_{0.03}Co_{0.03}O_{0.06}*Li_{0.03}Al_{0.03}O_{0.06}$, $Li_{1.28}Mn_{0.63}Ni_{0.37}O_{2.28}.Li_{0.03}Co_{0.03}O_{0.06}*Mg_{0.03}F_{0.06}$, $Li_{1.28}Mn_{0.63}Ni_{0.37}O_{2.28}.Li_{0.03}Co_{0.03}O_{0.06}*Li_{0.09}B_{0.03}O_{0.09}$, $Li_{1.28}Mn_{0.63}Ni_{0.37}O_{2.28}.Li_{0.03}Co_{0.03}O_{0.06}*Li_{0.03}Nb_{0.03}O_{0.09}$, $Li_{1.28}Mn_{0.63}Ni_{0.37}O_{2.28}.Li_{0.03}Co_{0.03}O_{0.06}*Li_{0.03}Mo_{0.03}O_{0.12}$, $Li_{1.28}Mn_{0.63}Ni_{0.37}O_{2.28}.Li_{0.03}Co_{0.03}O_{0.06}*Zr_{0.03}O_{0.03}$, and $Li_{1.28}Mn_{0.63}Ni_{0.37}O_{2.28}.Li_{0.03}Co_{0.03}O_{0.06}*Li_{0.06}W_{0.03}O_{0.12}$.

17. The electrode active composition according to claim 1, which is selected from the group consisting of:

$Li_{1.43}Mn_{0.715}Ni_{0.285}O_{2.43}.Li_{0.046}Co_{0.046}O_{0.092}$, $Li_{1.43}Mn_{0.715}Ni_{0.285}O_{2.43}.Li_{0.046}Co_{0.046}O_{0.092}.Li_{0.045}Ti_{0.021}O_{0.063}$, $Li_{1.43}Mn_{0.715}Ni_{0.285}O_{2.43}.Li_{0.046}Co_{0.046}O_{0.092}.Li_{0.045}Ti_{0.021}O_{0.063}*Al_{0.039}O_{0.058}$, $Li_{1.43}Mn_{0.715}Ni_{0.285}O_{2.43}.Li_{0.046}Co_{0.046}O_{0.092}.Li_{0.045}Ti_{0.021}O_{0.063}*Al_{0.039}F_{0.12}$, $Li_{1.4}Mn_{0.715}Ni_{0.285}O_{2.4}.Li_{0.034}Co_{0.034}O_{0.068}.Sn_{0.01}O_{0.02}$, $Li_{1.4}Mn_{0.715}Ni_{0.285}O_{2.4}.Li_{0.034}Co_{0.034}O_{0.068}.Sn_{0.01}O_{0.02}*Al_{0.039}O_{0.058}$, $Li_{1.4}Mn_{0.715}Ni_{0.285}O_{2.4}.Li_{0.034}Co_{0.034}O_{0.068}.Sn_{0.01}O_{0.02}*Al_{0.039}F_{0.12}$, and $Li_{1.4}Mn_{0.715}Ni_{0.285}O_{2.4}.Li_{0.034}Co_{0.034}O_{0.068}.Sn_{0.01}O_{0.02}*Li_{0.01}V_{0.01}O_{0.03}$.

18. The electrode active composition according to claim 1, which exhibits a specific discharge capacity of:

at least about 215 mAh/g at a discharge rate of 0.1C when discharged from 4.8V to 2.0V;

at least about 195 mAh/g at a discharge rate of 0.2C when discharged from 4.6V to 2.0V after the first cycle at 0.1C rate and between 4.8V and 2.0V;

at least about 185 mAh/g at a discharge rate of 0.2C when discharged from 4.45V to 2.0V after the first cycle at 0.1C rate and between 4.8V and 2.0V; or at least about 180 mAh/g at a discharge rate of 0.2C when discharged from 4.35V to 2.0V after the first cycle at 0.1C rate and between 4.8V and 2.0V.

19. A battery comprising the electrode active composition according to claim 1.

* * * * *